(12) United States Patent
Docherty

(10) Patent No.: US 9,346,598 B2
(45) Date of Patent: May 24, 2016

(54) SCORED AND LABELED RESEALABLE PACKAGING

(71) Applicant: Richard V. Docherty, DesPlaines, IL (US)

(72) Inventor: Richard V. Docherty, DesPlaines, IL (US)

(*) Notice: Subject to any disclaimer, the term of this patent is extended or adjusted under 35 U.S.C. 154(b) by 0 days.

(21) Appl. No.: 14/185,834

(22) Filed: Feb. 20, 2014

(65) Prior Publication Data

US 2014/0314339 A1 Oct. 23, 2014

Related U.S. Application Data

(60) Provisional application No. 61/766,888, filed on Feb. 20, 2013.

(51) Int. Cl.
B65D 33/16 (2006.01)
B65D 75/58 (2006.01)
B32B 9/00 (2006.01)

(52) U.S. Cl.
CPC .............. *B65D 75/5838* (2013.01); *B32B 9/00* (2013.01); *B32B 2439/00* (2013.01); *B65D 2101/00* (2013.01)

(58) Field of Classification Search
CPC ........... B65D 75/5838; B65D 75/2096; B65D 75/206; B65D 2575/586; B65D 2101/00; B65D 2577/2033; B65D 2577/205; B65D 2577/2066; B65D 2577/2091; B65D 33/20
USPC .................................... 383/66, 203, 204, 208
See application file for complete search history.

(56) References Cited

U.S. PATENT DOCUMENTS

| | | | |
|---|---|---|---|
| 4,679,693 A * | 7/1987 | Forman | 383/203 |
| 4,840,270 A | 6/1989 | Caputo | |
| 6,026,953 A | 2/2000 | Nakamura et al. | |
| D447,054 S | 8/2001 | Hill | |
| 6,428,867 B1 | 8/2002 | Scott et al. | |
| 6,918,532 B2 | 7/2005 | Sierra-Gomez et al. | |
| 7,324,867 B2 | 1/2008 | Dinauer et al. | |
| 7,910,855 B2 | 3/2011 | Dinauer et al. | |
| 8,016,963 B2 | 9/2011 | Klingbeil et al. | |
| 8,114,451 B2 | 2/2012 | Sierra-Gomez et al. | |
| 8,889,205 B2 * | 11/2014 | Sierra-Gomez et al. | 426/87 |
| 2002/0182359 A1 | 12/2002 | Muir et al. | |
| 2002/0198622 A1 | 12/2002 | Dinauer et al. | |
| 2005/0171630 A1 | 8/2005 | Dinauer et al. | |
| 2006/0144911 A1 | 7/2006 | Sierra-Gomez et al. | |
| 2007/0068838 A1 * | 3/2007 | Nakamura et al. | 206/494 |
| 2007/0084835 A1 | 4/2007 | Dinauer et al. | |
| 2009/0173428 A1 | 7/2009 | Klingbeil | |
| 2010/0002963 A1 * | 1/2010 | Holbert et al. | 383/204 |

(Continued)

*Primary Examiner* — Jes F Pascua
(74) *Attorney, Agent, or Firm* — Meroni & Meroni, PC; Charles F. Meroni, Jr.

(57) ABSTRACT

A resealable package integrity closure includes a lamination of films comprising a layer forming a top of container and having a scored flap defining an access opening to gain access to the contents of the container. The score that defines the opening flap cuts only into the outer layer of the film lamination and not through the sealing layer of film. A pressure-sensitive label functions as a sealing panel which completely covers the flap of the laminated film layer. A releasable adhesive is provided a pressure sensitive label that is applied over the film layer forming the top of the container. The pressure-sensitive label provides a sealing panel which is releasable from the film layer outside the perimeter of the score by peeling back the sealing panel. After opening the flap, the sealing panel of the pressure-sensitive label is reclosable against the top to seal the access opening.

7 Claims, 26 Drawing Sheets

(56) References Cited

U.S. PATENT DOCUMENTS

2010/0172604 A1* 7/2010 Andersson et al. ........... 383/211
2013/0056469 A1* 3/2013 Davis et al. ................... 220/266
2013/0121623 A1* 5/2013 Lyzenga et al. ............... 383/203
2013/0121624 A1* 5/2013 Lyzenga et al. ............... 383/203
2013/0177263 A1* 7/2013 Duan et al. ...................... 383/95
2014/0079343 A1* 3/2014 Lyzenga et al. ............... 383/203

* cited by examiner

SCORED AND LABELED RESEALABLE PACKAGING

PRIOR HISTORY

This application claims the benefit of U.S. Provisional Patent Application No. 61/766,888 filed in the United States Patent and Trademark Office on 20 Feb. 2013.

FIELD OF THE INVENTION

The present invention generally relates to a resealable closure for packages storing articles and, more particularly, relates to resealable closures for packages having a package integrity indicator.

BACKGROUND OF THE INVENTION

Some containers for food products, such as cookies and other snacks, typically include an outer wrapper. In one type of container, the wrapper surrounds a frame which acts as a tray to hold the food product and to protect the food product from damage. Other food products come packaged in plastic trays, such as thermoform trays which are sealed on the top using some type of lid material or construction.

Reclosable seals or pressure-sensitive labels have been used for dispensing bags for wet tissue or disposable cleaning wipes. The label on these bags can be pulled back thereby exposing an opening, allowing access to the wet tissues or wipes inside. Typically, these dispensing bags are completely flexible, formed exclusively of a plastic or other suitable flexible material which closely surrounds the pack of wet tissues or wipes. Examples of these dispensing bags include U.S. Pat. Nos. 4,840,270 and 6,026,953; U.S. Design Pat. No. D447,054 and U.S. Patent Application Publication No. 2002/0182359. However, such known dispensing bags are not well suited for containing food products as these containers fail to provide adequate protection for storing food products. Other relatively pertinent recent advancements in the art of food container closures include resealable closures of the type disclosed in U.S. Pat. Nos. 6,918,532 and 8,114,451.

Containers for products such as sliced natural cheese or meat do not include a frame surrounded by an outer wrapper. The shingled slices of cheese or meat may be supported by a board underneath the stack of slices, but such boards are not always used. One normally gains access to the contents of the container by opening the side of the wrapper, withdrawing the entire stack of slices and then removing as many slices as desired from the stack. However, because opening and resealing these packages is accomplished with the use of tear tapes and press-to-close zippers along one side of the container, these containers generally require more packaging material than is necessary to package the food.

Typically these packages will have a notch on the end seal and a tear tape sealed within the package to facilitate opening the package along the entire length of the package. When one opens the package by initiating opening at the tear notch and propagates the tear using the tear tape, two flaps of film remain along the opening side for one to pull each flap apart from the other in order to disengage the press-to-close zipper and thus gain access to the food. Then, one slides the entire stack from the container, removes the desired portion of food from the stack and then slides the remaining contents back into the container, and then presses the zipper closed along its entire length.

In order to remove the entire stack of food from the container, the container must also be longer than is necessary to package the food because pulling the front and back panels of the package apart to open the container draws the ends of the package closer together. Without extra length to the container it would be impossible to remove the entire stack from the container. Additionally, re-engaging the press-to-close zipper requires manual dexterity that older users may lack; even those having the required dexterity are often fooled by a clicking sound into thinking the zipper has be closed when it has not. When the zipper is not properly closed, the contents of the package can dry out and spoil faster than expected.

In another aspect, containers for products such as cooked and sliced meat are packaged in thermoformed plastic trays with flexible plastic lidding. The lidding is typically sealed to the filled tray on a flat flange along the outside perimeter of the tray using a specific combination of heat, pressure and dwell time. In some instances the lidding may be welded to the tray such that access to the food is gained only by cutting through the lid, which renders the package not reclosable. In other instances, the lidding may be peelable only, making the package easy to open, but still not reclosable. In other instances, the lidding itself may be peelable and resealable, such that package is easy to open and easy to reseal, but since the reseal area is only the width of the heat seal on the flange of the tray, even a small amount of contamination in the seal area can render the package not resealable.

In another aspect, containers for products such as cooked and sliced meats are packaged in thermoformed plastic trays with flexible plastic lidding, that has been die-cut to create an opening flap and immediately labeled to prevent the flap from curling such that a pressure-sensitive label would not be effective in keeping the lidding closed to protect the contents of the package. Since in this aspect the lidding material must be cut through and labeled simultaneously, the cutting and labeling must be performed directly on the packaging machine just prior to the lidding being sealed to the thermoformed tray. This requires a special adaptation to the packaging equipment adding a station for cutting and labeling, thus increasing the complexity of the packaging operation for the food packager.

An alternative to cutting and labeling on the packaging machinery is cutting and labeling in advance of placing the roll of packaging material on the packaging machine. Although this will minimize the complexity during the packaging operation, the food packager must accept shorter footage on each roll of packaging material. Each packaging machine has a maximum roll diameter for packaging material and if the lidding material also includes the labels, the length of material on the roll may be reduced by fifty percent or more.

Short rolls of packaging materials results in more roll changes, reduced productivity, and higher waste. This type of reclosable package can also be adapted to wrappers around a frame or tray containing food such as described for the cookie packaging above or wrappers with without a tray such as described for the natural cheese slices package described above. All such packages that incorporate die-cutting and labeling to achieve easy opening and resealability shall be referred to in this specifications as "die-cut and labeled" packaging systems.

In this document, the present invention shall be referred to as "scored and labeled" packaging systems. Although the end consumer may perceive die-cut and labeled packages to function similarly to scored and labeled packages, there are important differences for the food packager. In the packaging art, different methods have been used to indicate whether a package has been previously opened or whether the integrity of the package has been compromised, which is often referred to in the art as "tamper-evident." For example, in the tissue wipes packaging art of U.S. Pat. No. 6,428,867 (hereinafter "the '867 patent"), a means for indicating package integrity includes a tamper-evident tab with one or more ink layers which is initially an integral part of a sealing panel prior to the package being opened for a first time. The tab is transferred with one of the ink layers from the sealing panel to the top of the package when the closure has been opened for a first time. Tamper-evidence is indicated in a misalignment of the sealing panel with an image on the transferred tab, which is visible through a transparent outer layer of the sealing panel, after the sealing panel has been resealed to the top of the package.

There is a need for improvement in the art for package integrity indicators for a resealable closure, preferably suitable for use with a resealable closure for containers or packages containing food items.

SUMMARY OF THE INVENTION

The present invention generally relates to a resealable closure for a container formed from a two-ply material (two-ply structures will be most common for my invention, but one-ply, three-ply, and four and five-ply structures are possible), which has a package integrity indicator in the form of higher peel force necessary to peel open the package by breaking though the inside sealing ply when the package-has been opened for a first time.

The present invention, in one form, comprises a package integrity closure comprising a film layer forming a top of a container and having a scored outer ply which upon peeling of a resealable label becomes a flap defining an access opening to gain access to the contents of the container. A sealing panel in the form of a pressure-sensitive label completely covers the flap of the film layer. A releasable adhesive is provided on the pressure-sensitive label which functions as the resealing panel after the package has been opened the first time. The resealing panel is releasable from the film layer by pulling the pressure-sensitive label back in a peeling direction and reclosable against the top to reseal the access opening when the pressure-sensitive label is moved back against the top.

The resealing panel is the portion of a discrete label applied over a film layer forming the top of the container, and is defined as the area between the outer perimeter of the label and the score-line in the top layer of package such as the container of the '532 patent. Further, the perimeter edge of the sealing panel can be either linear or nonlinear such as a zigzag pattern. An essential aspect of the present invention is that the innermost layer, or sealing layer of the packaging material remains uncut, unscored, and unbroken until the pressure-sensitive label has been peeled back to create the access panel as the package is opened the first time.

An important aspect of the present invention is that the pressure-sensitive label works well when there are two distinct levels of adhesion in the coating on the pressure-sensitive label, in the area defined as the reseal panel the coating must be peelable, having a tack level low enough that the label can be easily peeled from the top layer of the package by hand, and resealable, having enough sustainable tack to adhere repeatedly to the top layer of the packaging material as the package will be opened a closed repeatedly to remove individual servings and to preserve the remaining contents of the package. This peelable and resealable coating defines the first level of adhesion.

The second level of adhesion that enhances the function of the system is the application of a permanent non-peelable adhesive on the pressure sensitive label which is applied to the top layer of the packaging material adjacent to the access flap inside the perimeter of the laser score on the outside layer of the packaging material. The purpose of the permanent adhesive coating is to adhere tightly to the top layer of film in the access flap area, to prevent the pressure-sensitive label from being peeled entirely off of the outer surface of the package, and to maintain a grip on the access flap as the peeling action encounters resistance from the yet unbroken inner ply of the packaging material. The force necessary to peel the pressure sensitive label entirely off of the surface of the packaging material must be significantly higher than the force required to break and tear the inner ply and gain access to the contents of the package. It is possible that a coating with a moderate adhesion level will function as peelable and resealable U.S. Pat. No. 8,114,451 shows secondary evidence of package integrity provided in the form of a reduction in peel force between the sealing panel and the film layer after the closure has been previously opened and subsequently resealed due to a deadening effect resulting from the transfer of the coating from the sealing panel or film layer to the adhesive on the opposite surface or the transfer of adhesive with coating material from either the film layer or sealing panel to the opposite surface.

The present invention, by contrast, provides "evidence of package integrity in the form of a reduction in peel force between the sealing panel and the film layer after the closure has been previously opened and subsequently resealed," but this is not due to a deadening effect resulting from the transfer of the coating from the sealing panel or film layer to the adhesive on the opposite surface or the transfer of adhesive with coating material from either the film layer or sealing panel to the opposite surface." The reduction in peel force is due to the fact that the second layer of the top of the package which had not been cut or scored completely prior to the initial opening has been broken or torn to initially open the package. After the second layer has been broken upon the first opening of the package, subsequent openings require a lower peel force.)

The second layer of the present invention does not have a score line, especially if it is an un-oriented film, commonly uses as a sealing layer. If the first and second layers of the package are both oriented films, the second layer may require a score that aligns very close to the score in the top layer, but neither the score in the first or second layer should penetrate entirely through the scored layer. The sealing panel of the present invention is the area between the perimeter of a pressure-sensitive label applied to the first film layer on the outside of the package and the perimeter of the tear line in the first film layer.

The pressure sensitive label must be placed in contact with the first film layer toward the outside of the package. The label adheres to the outside of the first film layer my means of an adhesive which has been applied to the one side of the label, which faces the outside of the first film layer. The pressure-sensitive label should be designed with a peel tab that has no adhesive, or sufficiently deadened adhesive on the inside, in contact with the outside of the first film layer. The peel tab functions as the initiation point for opening the package.

The pressure-sensitive label must be coated with and adhesive that can be easily peeled away from the first film layer of the package, such that the consumer can lift the peel tab of the label and peel the label to open the package. Pressure-sensitive labels are available commercially which are coated with adhesives that are designed to be peelable and resealable. Such peelable and resealable pressure-sensitive labels are ideal for use in the present invention, however, one significant modification must be made to such labels to function properly in this invention. The labels must be coated with a section of permanent, non-peelable adhesive inside the perimeter of the tear line or score in the first film layer.

The permanent adhesive can cover the entire area inside the perimeter of the score-line in the first film layer, but it must cover at least an area inside the perimeter of the score adjacent to the initiation point for opening the package. The area covered by permanent adhesive must be large enough to prevent the label from being peeled entirely off of the first film label without initiating a tear along the score-line in the outer film layer when the package is peeled open initially. The bond between the label and the first film layer must be higher than the force required to break the second film layer, which when broken initiates the opening of the package when the label is peeled to open the package.

The present invention, in another form thereof, concerns a package integrity indicating closure for a container comprising an at least two-ply laminated material comprising a heat sealable inner layer adhesively joined to a laser scored outer layer and forming a top or lid of the container. The lid may also be a three-ply material composed of a scored oriented plastic film outer layer, adhesively laminated to aluminum foil as the middle layer, which is again adhesively laminated to a non-oriented heat sealable film as the inner layer. The container is typically thermoformed from either a single layer or multiple layered plastic sheet.

The plastic sheet that is formed into the container has been heated to a softening point and vacuum formed, sometimes with a plug assist into a cavity that defines the shape of the container. The container includes a flat sealing flange around the perimeter at the top of the container. The inner layer of the lid is a heat sealable film designed to produce a non-peelable seal along the flat sealing flange of the container. The outer layer of the lid is a laser scored oriented film. The laser score must be registered in the area of the lid, typically in a U-shape that defines the eventual opening panel of the lid. A pressure-sensitive label coated with a peelable and resealable adhesive is applied on the lid extending outside the perimeter of the laser score in the outer layer of the lid. The resealing panel of the package is the area between the outer perimeter of the label and the laser score in the outer layer of the lid.

The label must also have an area of permanent, non-peelable adhesive adjacent to the opening point inside the perimeter of the laser score. The permanent adhesive can cover the entire area inside the perimeter of the score-line in the first film layer, but it must cover at least an area inside the perimeter of the score adjacent to the initiation point for opening the package. The area covered by permanent adhesive must be large enough to prevent the label from being peeled entirely off of the first film label without initiating a tear along the score-line in the outer film layer when the package is peeled open initially.

The bond between the label and the first film layer must be higher than the force required to break the second film layer, which when broken, initiates the opening of the package when the label is peeled to open the package. Because the inside sealant layer of the lid is not scored or cut prior to opening, the sealant layer must be ruptured and torn from the action of peeling and opening the package. The force required to open the package the first time is higher than on subsequent openings. The higher force required to initially open the package provide the consumer with a tactile cue of tamper evidence. Food items disposed in the container may include cookies, crackers, peanuts, cheese, sliced meats and semi-solid foods.

Other features and advantages of the present invention are stated in or apparent from detailed descriptions of the presently preferred embodiments of the invention found here below.

BRIEF DESCRIPTION OF THE DRAWINGS

Other features and objectives of my invention will become more evident from a consideration of the following brief description of patent drawings.

DETAILED DESCRIPTION OF THE PREFERRED EMBODIMENT

Figure 1:
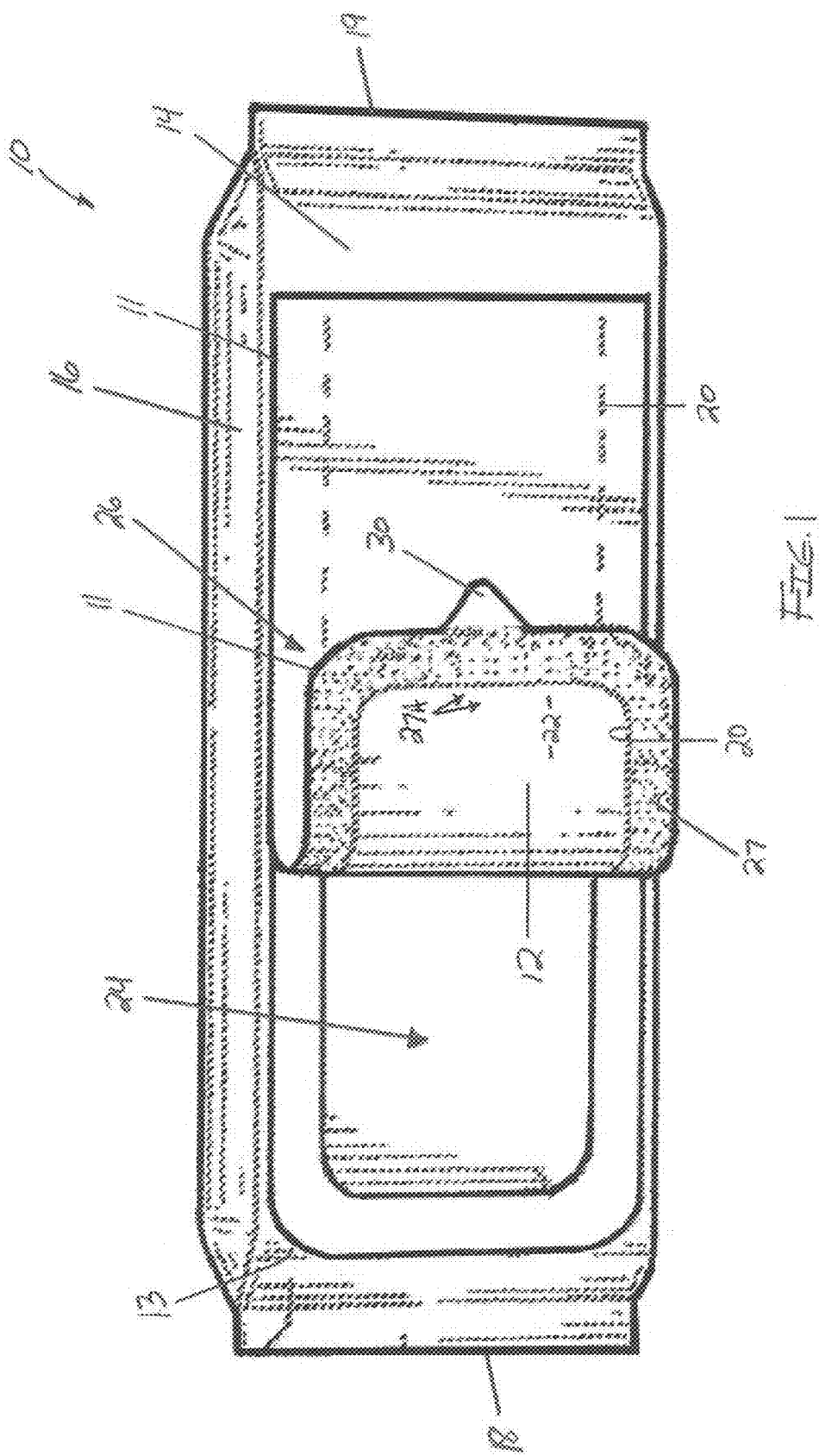
FIG. 1 is a top side perspective view of a first embodiment of the scored and labeled resealable packaging according to the present invention, a label construction of the first embodiment being shown in a partially peeled back configuration.

Referring now to the figures with more specificity, there is shown a first package 10 with pressure-sensitive label 11 functioning as a closure mechanism. Package 10 includes a two-ply wrapper comprising a first, inner film layer 12 and a second, scored outer film layer 13, forming a top or upper surface 14, sides 16 laterally opposite a center plane 141, a lower surface (not specifically illustrated), and longitudinally opposed crimped ends as at 18 and 19. The inner film layer 12 and outer film layer 13 are preferably formed from a polymeric film or other flexible material that has been cut, folded or otherwise pressed to define an inner space or receptacle for receiving the desired product, such as food items, to be provided within the package 10.

Package 10 can be used to store and distribute food items such as cookies, crackers, candy or other items. The outer film layer 13 may include graphics or other indicia to identify the contents of the package 10. The pressure-sensitive label 11 may include graphics or other indicia to identify the contents of the package, to provide opening and resealing instructions. The package integrity feature is provided by the force required to break through the inner film layer 12 when the label 11 is peeled back to open the package 10.

Advantageously, the inner film layer 12 is coextensively formed and adhesively joined to the outer film layer 13. During the manufacturing of package 10, the inner film layer 12 is not cut along score line 20 and the outer film layer 13 is scored along the score line 20. The score line 20 is formed as a continuous tear line to define an inner panel portion 22. The inner panel portion 22 is separated from the remainder of the inner film layer 12 and outer film layer 13 to expose an opening 24, whereby access to the contents of the package 10 may be gained.

The area of the outer film layer 13 directly underneath the label 11 is the outer perimeter of the resealing area 21 defines resealing outer panel portion 26, which is the inside surface of the label 11, coated with a peelable and resealable tack adhesive. The resealing outer panel portion 26 extends outwardly beyond the periphery of the score line 20, adjacent to the opening 24, so that the resealing outer panel portion 26 completely covers and extends beyond the perimeters of the inner panel portion 22.

The side of the resealing outer panel portion 26 which faces the outer film layer 13 is coated with a releasable and resealable adhesive 27 on the inner surface of the label 11 so that the sealing outer panel portion 26 may be releasably secured to the outer film layer 13 at a position adjacent to the inner panel portion 22. The releasable adhesive can be any pressure sensitive adhesive which allows resealing and includes, but is not limited to adhesives such as those exemplified or disclosed in U.S. Patent Application Publication No. 2006/0144911. The resealing outer panel portion 26 is provided with a starter portion or tab 30 or other gripping feature which is not coated with the adhesive 27 or the adhesive had been completely deadened so that the sealing outer panel portion 26 may be peeled back from the outer film layer 13 to open the package 10.

A coating of non-transferable or permanent adhesive 27A is preferably located on all or a portion of the label 11 inside the perimeter of the score line 20. If only a portion of the label inside the perimeter of the score line 20 is to be coated with the permanent adhesive 27A, the permanent adhesive 27A must be in the proximity of the opening tab 30, within the perimeter of the score line 20 so that the resealing outer panel portion 26 will function properly to reseal the package 10 after the initial and subsequent opening of the package 10.

The proper function of the present invention relies on a differential in adhesion levels of the coatings on the inside of the label 11. One alternative is to apply a releasable and resealable adhesive 27 over the entire inside surface of the label 11, and on the inside of the tab 30 another coating is applied that completely deadens the adhesion. This complete deadening can also be accomplished by having a void in the adhesive coverage on the inside of the tab area 30.

Inside the perimeter of the score line 20 the label 11 must be coated with a non-releasable or permanent adhesive 27A. The releasable and resealable adhesive 27 maintains its bond level in the resealing outer panel portion 26. The permanent adhesive 27A grips tightly to the outer film layer 13 such that the force required to remove the label 11 from the outer film layer 13 is significantly higher than the force required to break the inner film layer 12 as the user peels back the label 11 to initially open the package 10.

In an alternative embodiment, the differing bonding strengths of the adhesives applied to the label 11 can be accomplished by applying a non-releasable or permanent adhesive 27A over the entire inside surface of the label 11, and then applying another coating over the permanent adhesive 27A on the inside of the tab 30 to reduce the bond strength to zero, or very close to zero, and apply a coating over the permanent adhesive 27A that deadens the bond strength to approximately half of its original bond strength in the resealing outer panel portion 26, such that the adhesive in the resealing outer panel portion 26 is releasable and resealable.

Figure 2:
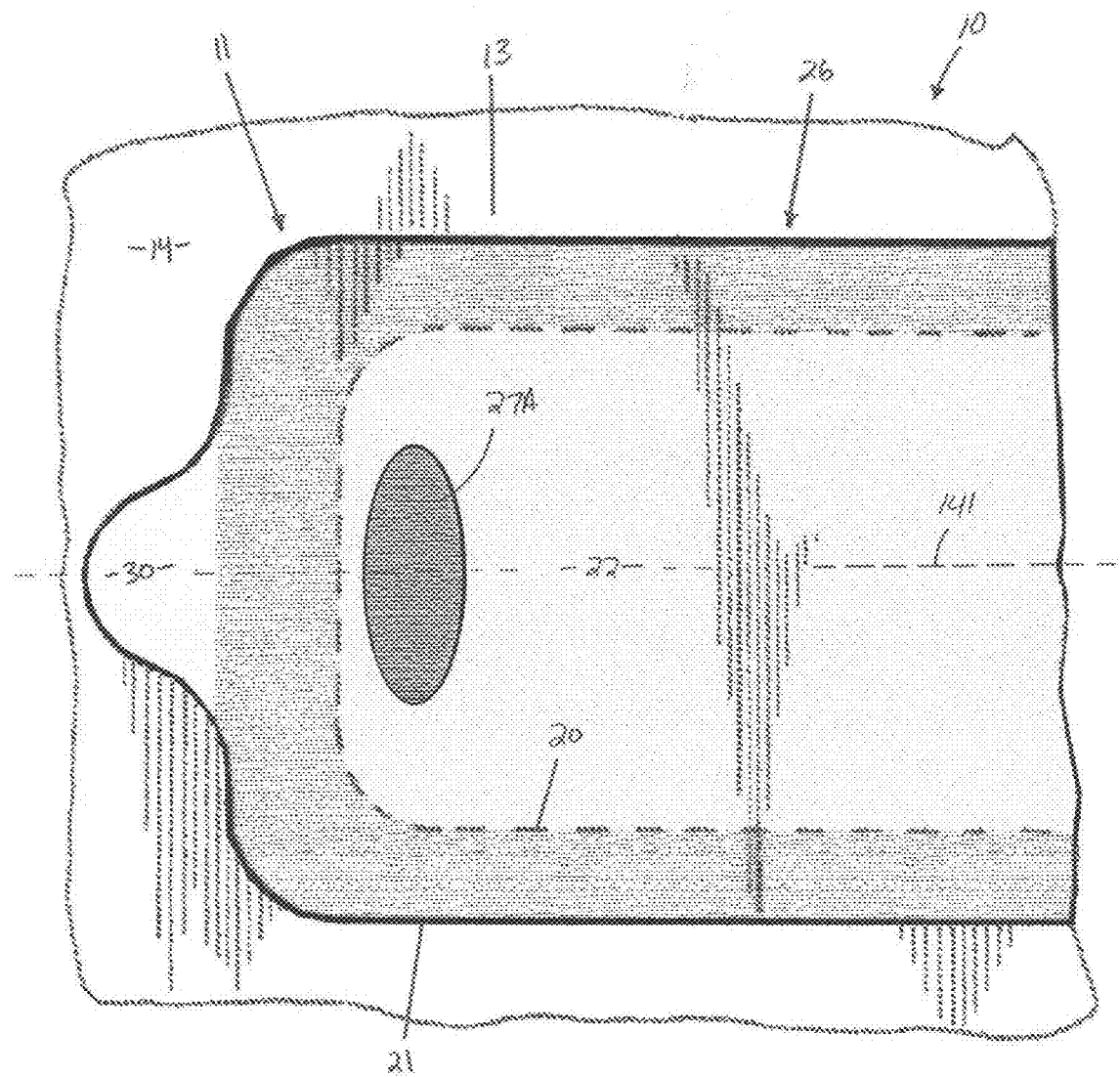
FIG. 2 is an enlarged, fragmentary top plan view of a first end of the first embodiment of the scored and labeled resealable packaging according to the present invention, the label construction of the first embodiment being shown in a package-closing configuration.
Figure 3:
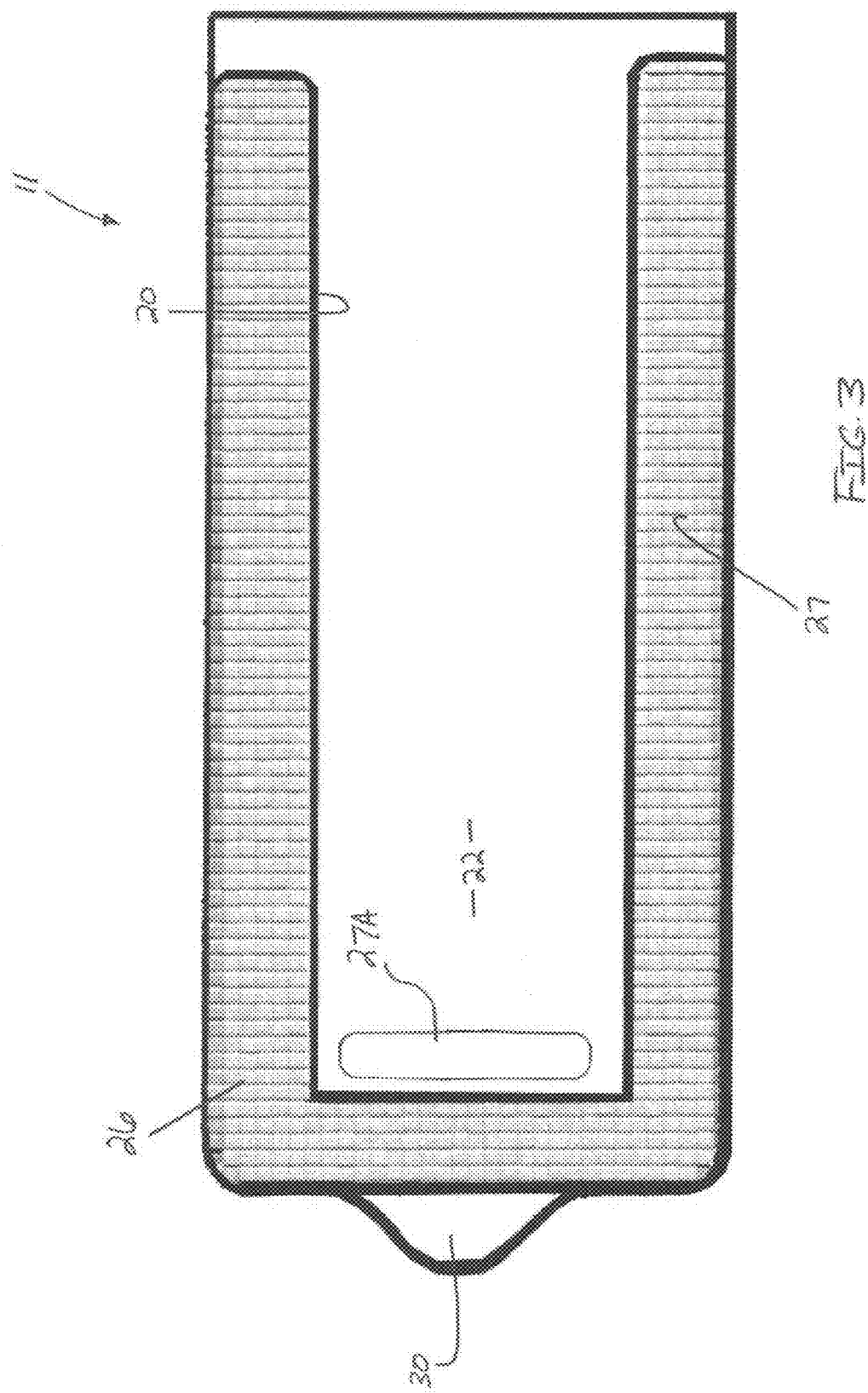
FIG. 3 is a bottom plan view of the label construction of the first embodiment of the scored and labeled resealable packaging according to the present invention.
Figure 4:
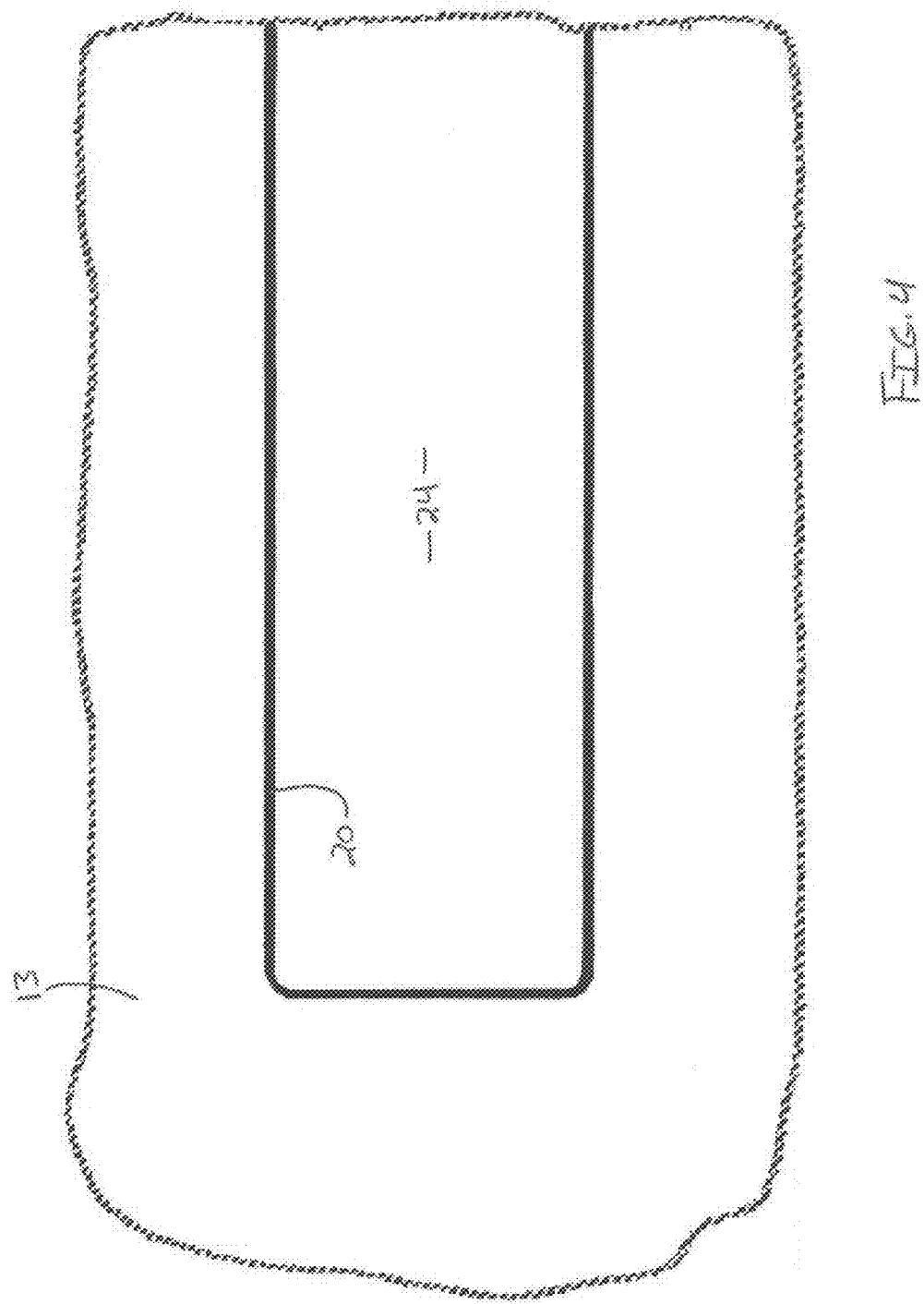
FIG. 4 is an enlarged, fragmentary top plan view of a first end of the lower container or wrapper structure of the scored and labeled resealable packaging according to the present invention showing an access opening formed in the lower container or wrapper structure.
Figure 5:
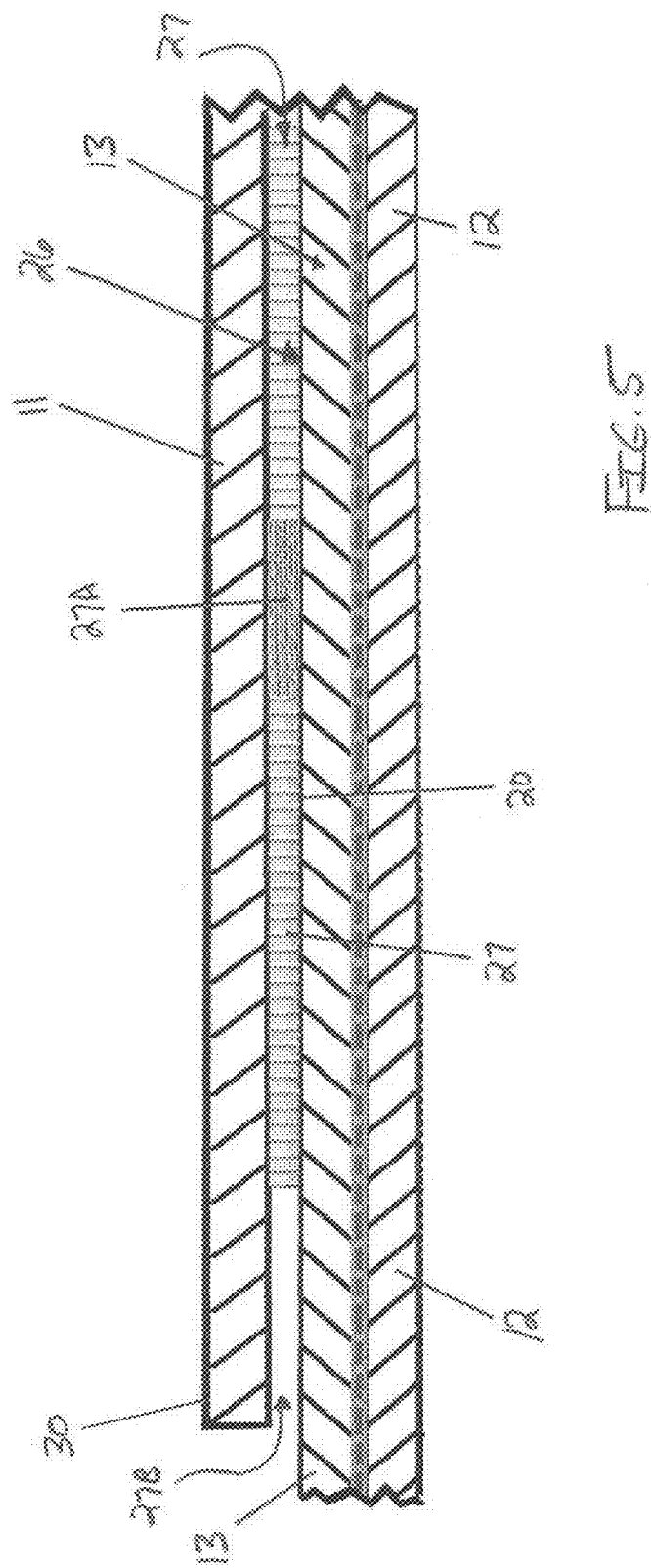
FIG. 5 is an enlarged, fragmentary cross-sectional view of the first embodiment of the scored and labeled resealable packaging according to the present invention taken along a center longitudinal center plane of the first embodiment.
Figure 6:
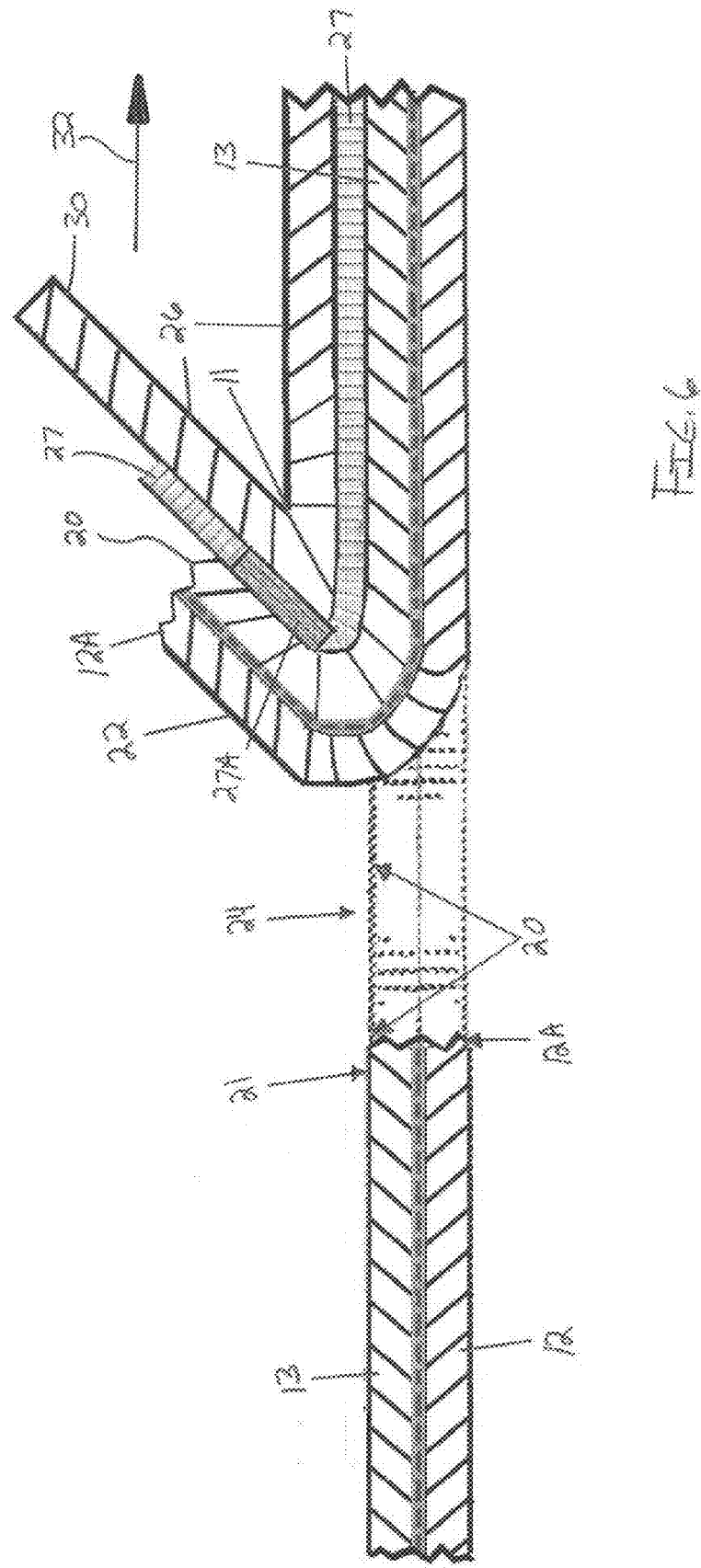
FIG. 6 is an enlarged, fragmentary cross-sectional view of the first embodiment of the scored and labeled resealable packaging according to the present invention taken along a center longitudinal center plane of the first embodiment and depicting an initial opening of the packaging.
Figure 7:
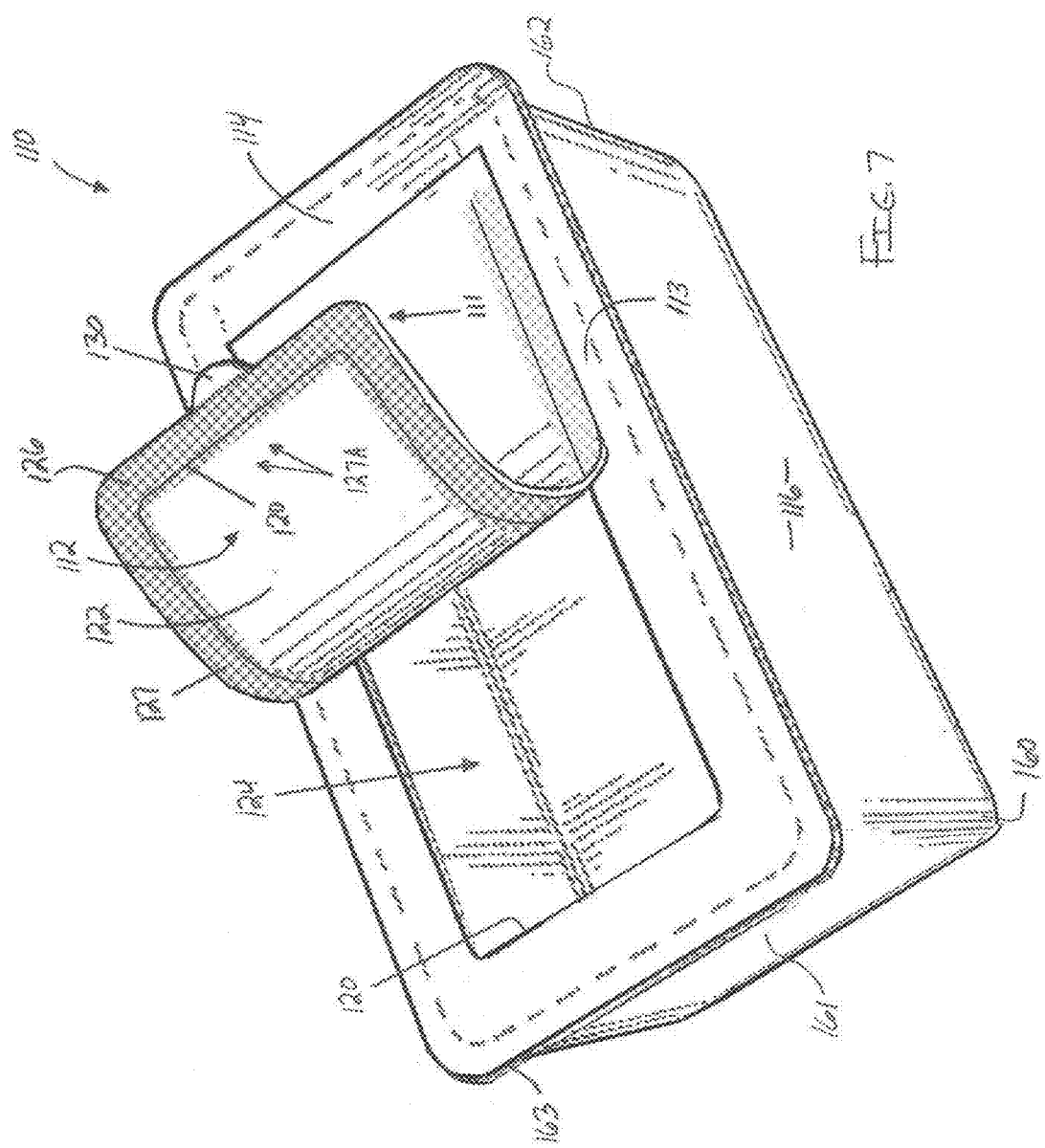
FIG. 7 is a top side perspective view of a second embodiment of the scored and labeled resealable packaging according to the present invention, a label construction of the second embodiment being shown in a partially peeled back configuration.
Figure 8:
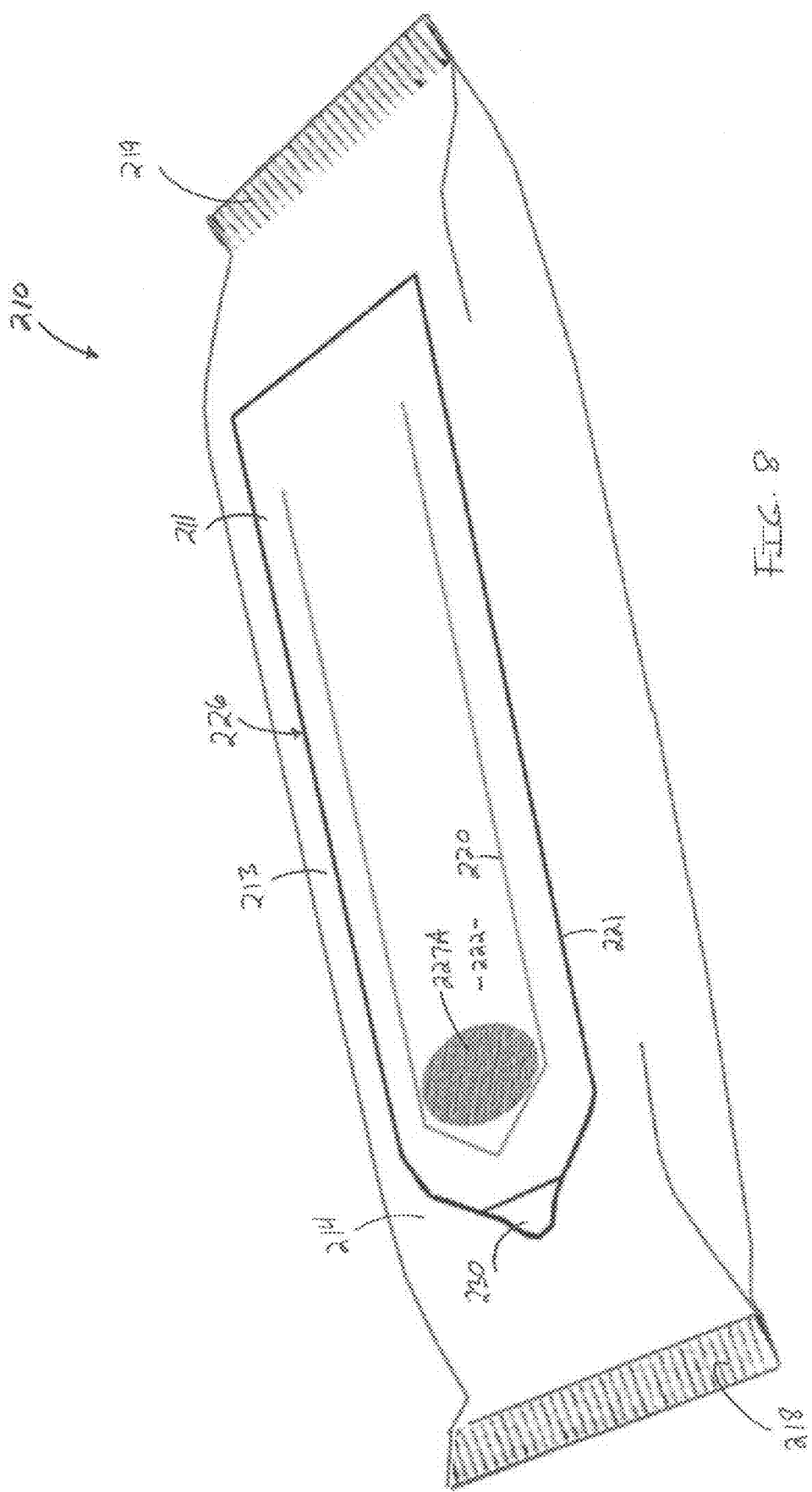
FIG. 8 is a top side perspective view of a third embodiment of the scored and labeled resealable packaging according to the present invention, a label construction of the third embodiment being shown in a package-closing configuration.
Figure 9:
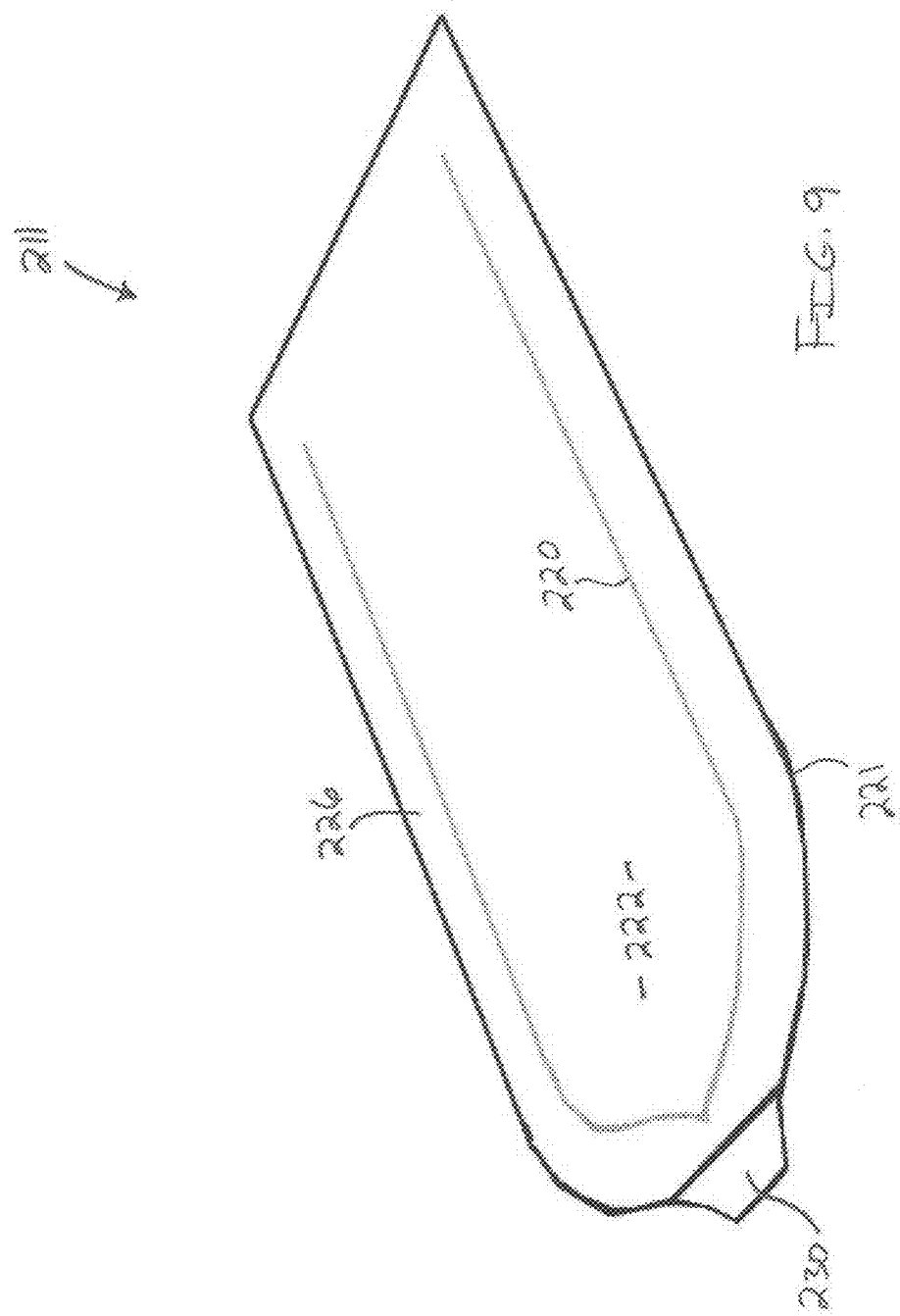
FIG. 9 is a bottom perspective view of a label construction of the third embodiment of the scored and labeled resealable packaging according to the present invention, the label construction being shown with all adhesive zones removed.
Figure 10:
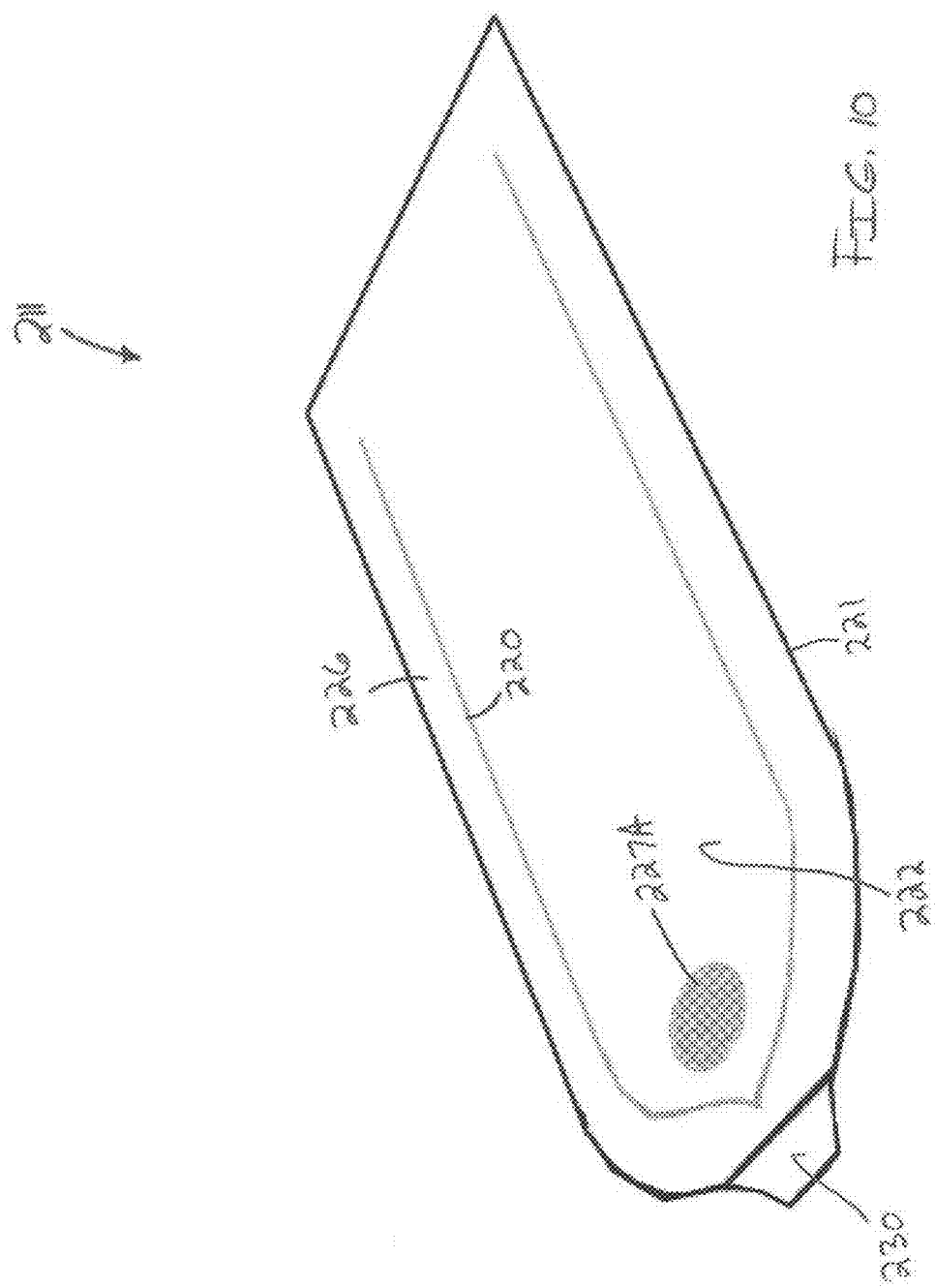
FIG. 10 is a bottom perspective view of a label construction of the third embodiment of the scored and labeled resealable packaging according to the present invention as otherwise depicted in FIG. 9, but for the label construction being shown with a permanent adhesion zone included.
Figure 11:
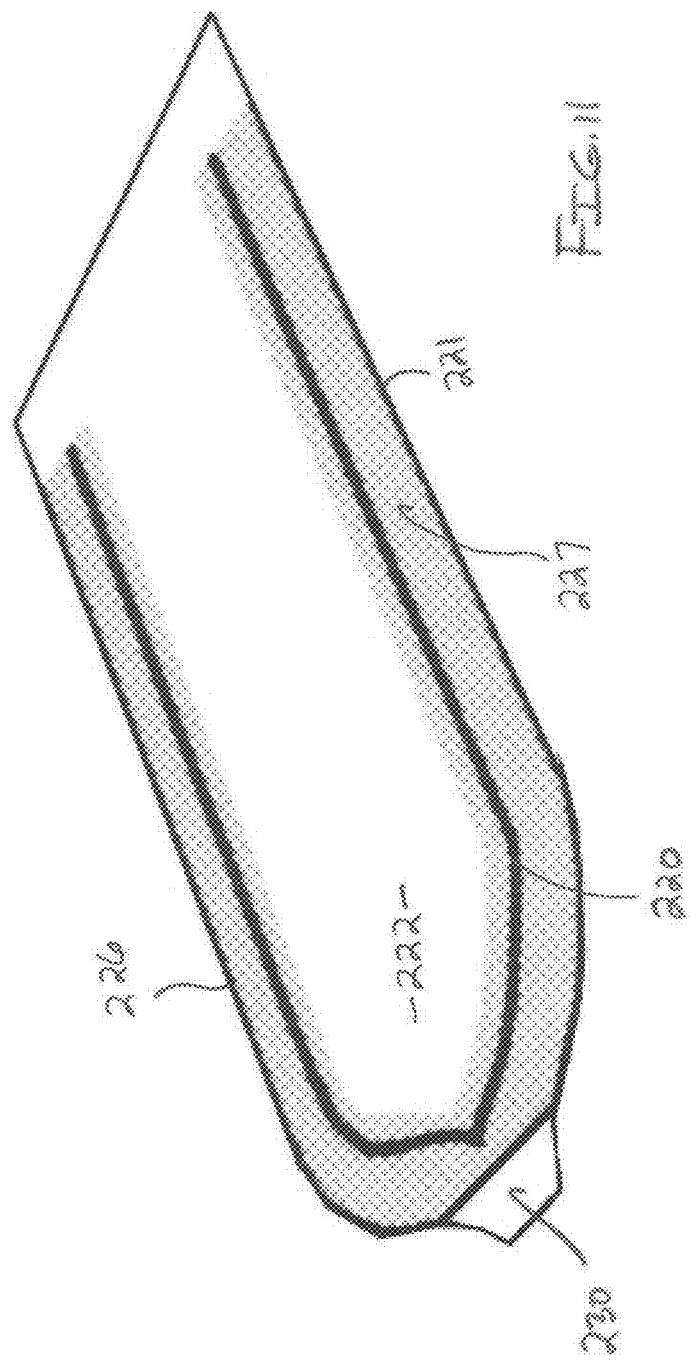
FIG. 11 is a bottom perspective view of a label construction of the third embodiment of the scored and labeled resealable packaging according to the present invention as otherwise depicted in FIG. 9, but for the label construction being shown with a releasable adhesion zone included.
Figure 12:
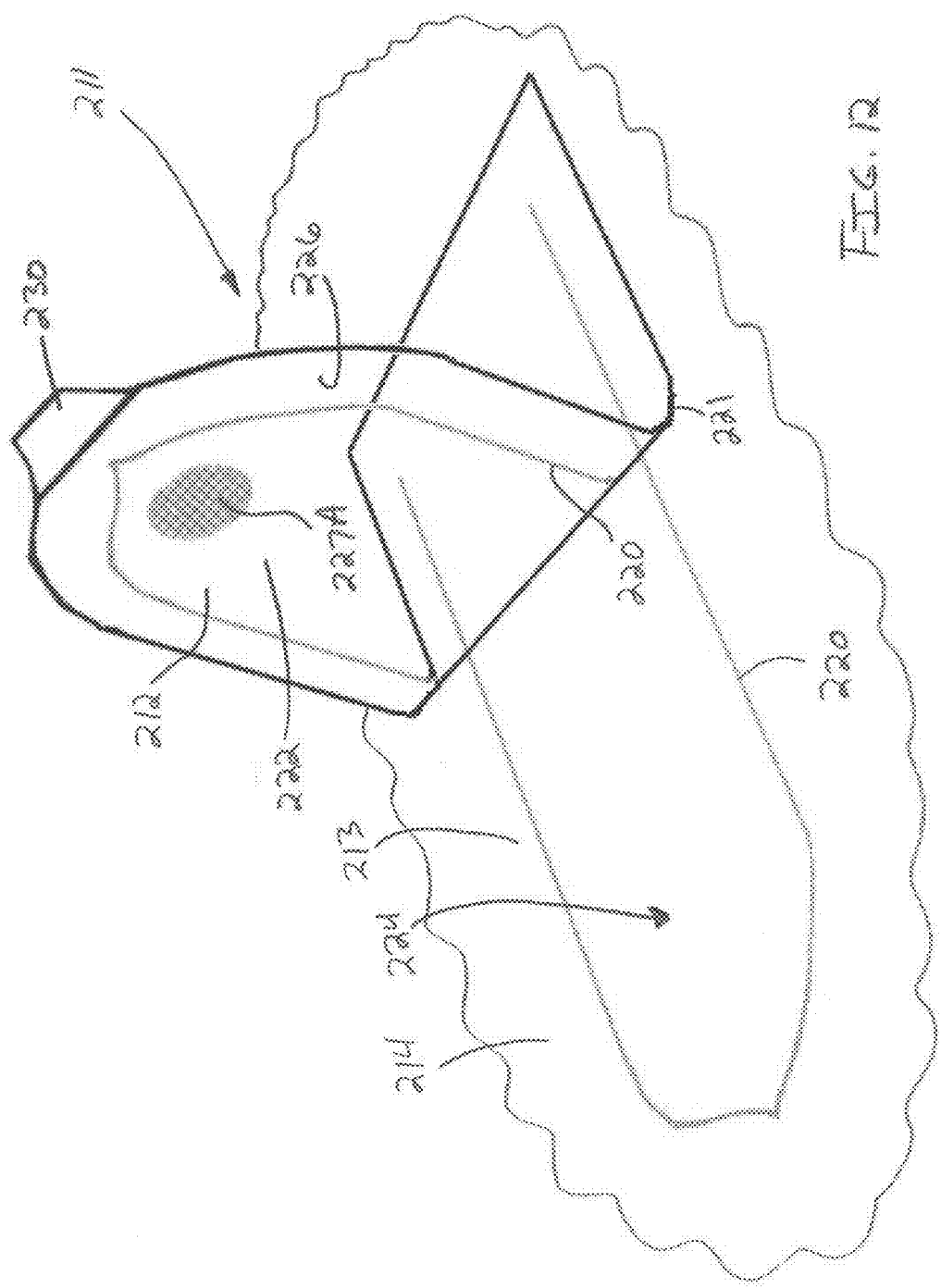
FIG. 12 is a fragmentary top side perspective view of a third embodiment of the scored and labeled resealable packaging according to the present invention, a label construction of the third embodiment being shown in a peeled back configuration atop a fragmentary lower container or wrapper construction.
Figure 13:
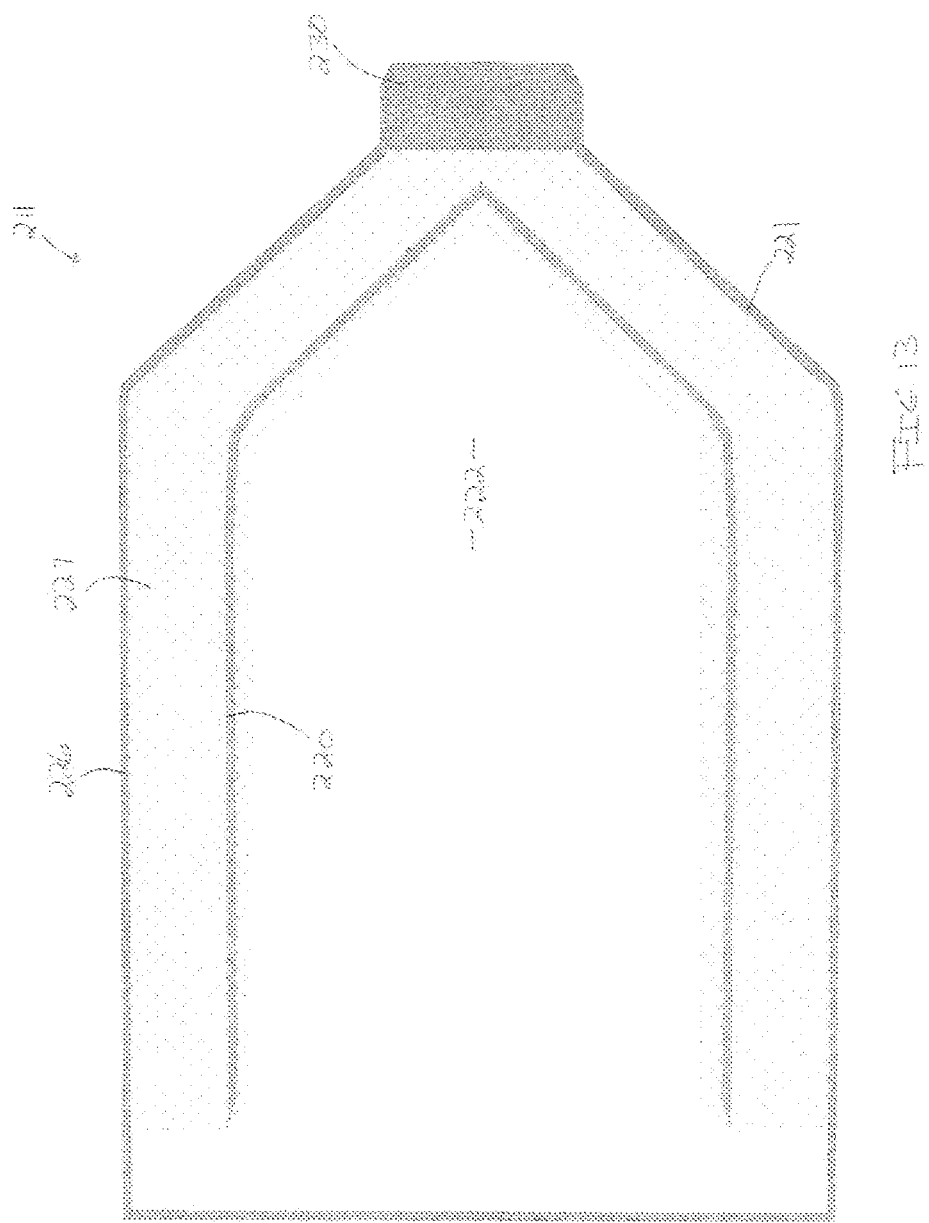
FIG. 13 is a bottom plan view of a label construction of the third embodiment of the scored and labeled resealable packaging according to the present invention as otherwise depicted in FIG. 9, but for the label construction being shown with a releasable adhesion zone included.

As comparatively shown in FIGS. 5 and 6, the inner panel portion 22 is separated from the remainder of the inner film layer 12 along the first tear line 20 and remains adhered to the sealing outer panel portion 26 as the sealing outer panel portion 26 is peeled back in a peeling direction indicated by arrow 32 to open the package 10. After the contents of the package have been accessed and it is desired to reseal the package 10, the sealing outer panel portion 26 may be reapplied to the inner film layer 12, approximately in its original position, as generally depicted in FIG. 2. Because the sealing outer panel portion 26 extends beyond the periphery of the inner panel portion 22, the releasable adhesive 27 disposed thereon facilitates the resealing of the package 10 with the inner panel portion 22 positioned over the access opening 24.

Referring to FIGS. 8-13, the reader will note a third embodiment of the package according to the present invention as at 210. Package 210 preferably provides a labeled wrapper comprising a label construction as at 211 according to the inventive concepts of the present invention. Further, the package 210 preferably comprises a first, inner film layer as at 212 and a second, scored outer film layer as at 213, forming a top or upper surface 214, and crimped ends as at 218 and 219. The inner film layer 212 and outer film layer 213 are preferably formed from a polymeric film or other flexible material that has been cut, folded or otherwise pressed to define an inner space or receptacle for receiving the desired product, such as food items, to be provided within the package 210.

Advantageously, the inner film layer 212 is coextensively formed and adhesively joined to the outer film layer 213. During the manufacturing of package 210, the inner film layer 212 is not cut along score line 220 and the outer film layer 213 is scored along the score line 220. The score line 220 is formed as a continuous tear line to define an inner panel portion 222. The inner panel portion 222 is separated from the remainder of the inner film layer 212 and outer film layer 213 to expose an opening 224, whereby access to the contents of the package 210 may be gained.

The area of the outer film layer 213 directly underneath the label construction 211 is the outer perimeter of the resealing area 221 defines resealing outer panel portion 226, which is the inside surface of the label 211, coated with a peelable and resealable tack adhesive. The resealing outer panel portion 226 extends outwardly beyond the periphery of the score line 220, adjacent to the opening 224, so that the resealing outer panel portion 226 completely covers and extends beyond the perimeters of the inner panel portion 222.

The side of the resealing outer panel portion 226 which faces the outer film layer 213 is coated with a releasable and resealable adhesive 227 on the inner surface of the label 211 so that the sealing outer panel portion 226 may be releasably secured to the outer film layer 213 at a position adjacent to the inner panel portion 222. The releasable adhesive can be any pressure sensitive adhesive which allows resealing. The resealing outer panel portion 226 is provided with a starter portion or tab 230 or other gripping feature which is not coated with the adhesive 227 or the adhesive had been completely deadened so that the sealing outer panel portion 226 may be peeled back from the outer film layer 213 to open the package 210.

A coating of non-transferable or permanent adhesive 227A is preferably located on all or a portion of the label construction 211 inside the perimeter of the score line 220. If only a portion of the label inside the perimeter of the score line 220 is to be coated with the permanent adhesive 227A, the permanent adhesive 227A must be in the proximity of the opening tab 230, within the perimeter of the score line 220 so that the resealing outer panel portion 226 will function properly to reseal the package 210 after the initial and subsequent opening of the package 210.

The proper function of the present invention relies on a differential in adhesion levels of the coatings on the inside of the label 211. One alternative is to apply a releasable and resealable adhesive 227 over the entire inside surface of the label 211, and on the inside of the tab 230 another coating is applied that completely deadens the adhesion. This complete deadening can also be accomplished by having a void in the adhesive coverage on the inside of the tab area 230.

Inside the perimeter of the score line 220 the label construction 211 must be coated with a non-releasable or permanent adhesive 227A. The releasable and resealable adhesive 227 maintains its bond level in the resealing outer panel portion 226. The permanent adhesive 227A grips tightly to the outer film layer 213 such that the force required to remove the label 211 from the outer film layer 213 is significantly higher than the force required to break the inner film layer 212 as the user peels back the label construction 211 to initially open the package 210.

In an alternative embodiment, the differing bonding strengths of the adhesives applied to the label construction 211 can be accomplished by applying a non-releasable or permanent adhesive 227A over the entire inside surface of the label construction 211, and then applying another coating over the permanent adhesive 227A on the inside of the tab 230 to reduce the bond strength to zero, or very close to zero, and apply a coating over the permanent adhesive 227A that deadens the bond strength to approximately half of its original bond strength in the resealing outer panel portion 226, such that the adhesive in the resealing outer panel portion 226 is releasable and resealable.

The inner panel portion 222 is separated from the remainder of the inner film layer 212 along the first tear line 220 and remains adhered to the sealing outer panel portion 226 as the sealing outer panel portion 226 is peeled back to open the package 210. After the contents of the package 210 have been accessed and it is desired to reseal the package 210, the sealing outer panel portion 226 may be reapplied to the inner film layer 212, approximately in its original position. Because the sealing outer panel portion 226 extends beyond the periphery of the inner panel portion 222, the releasable adhesive 227 disposed thereon facilitates the resealing of the package 210 with the inner panel portion 222 positioned over the access opening 224.

Figure 14:
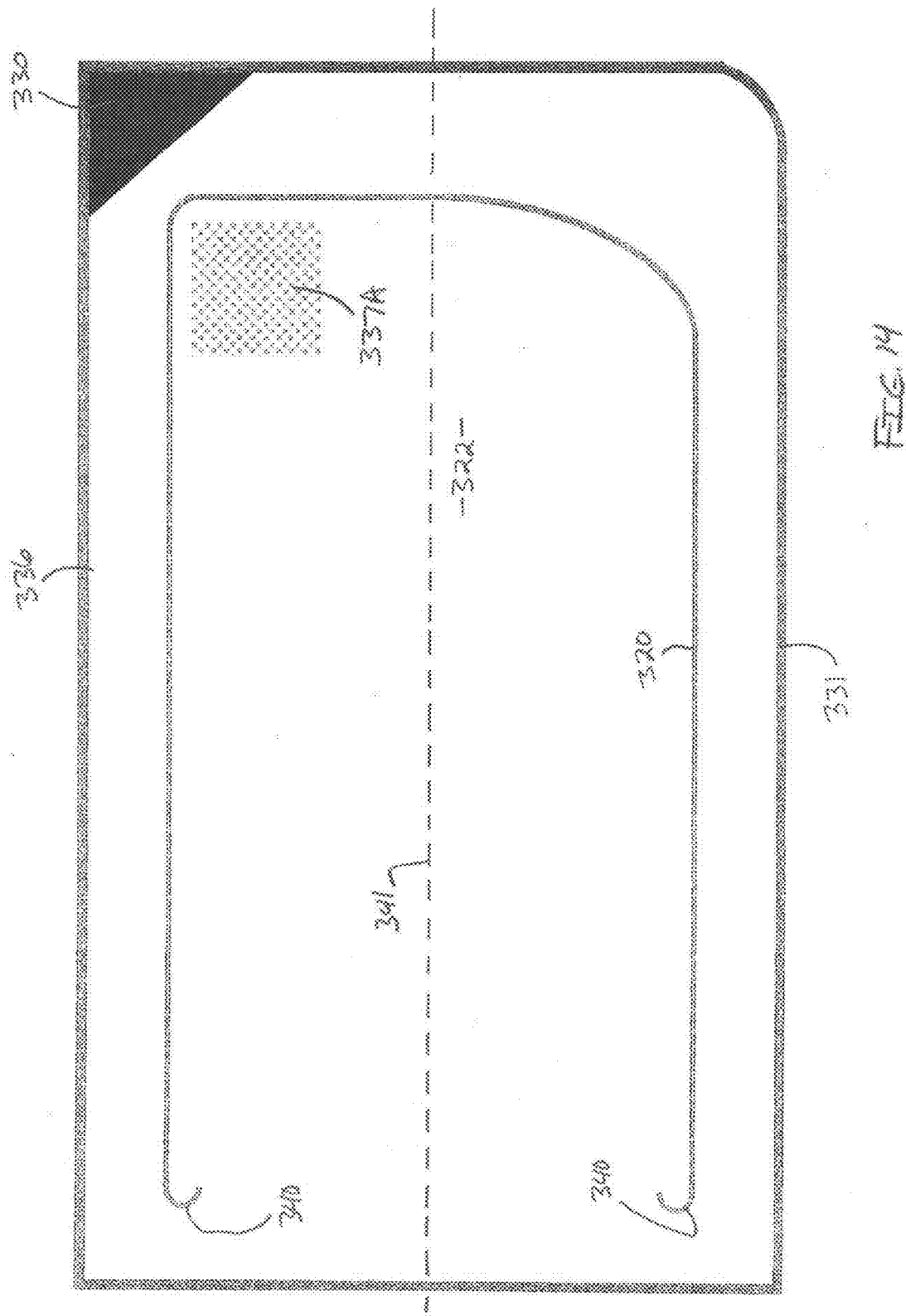
FIG. 14 is a bottom plan view of a fourth label construction of the scored and labeled resealable packaging according to the present invention, the label construction being shown with both a permanent adhesion zone and a zero-to-negligible adhesion zone included, the removable adhesion zone not being depicted.
Figure 15:
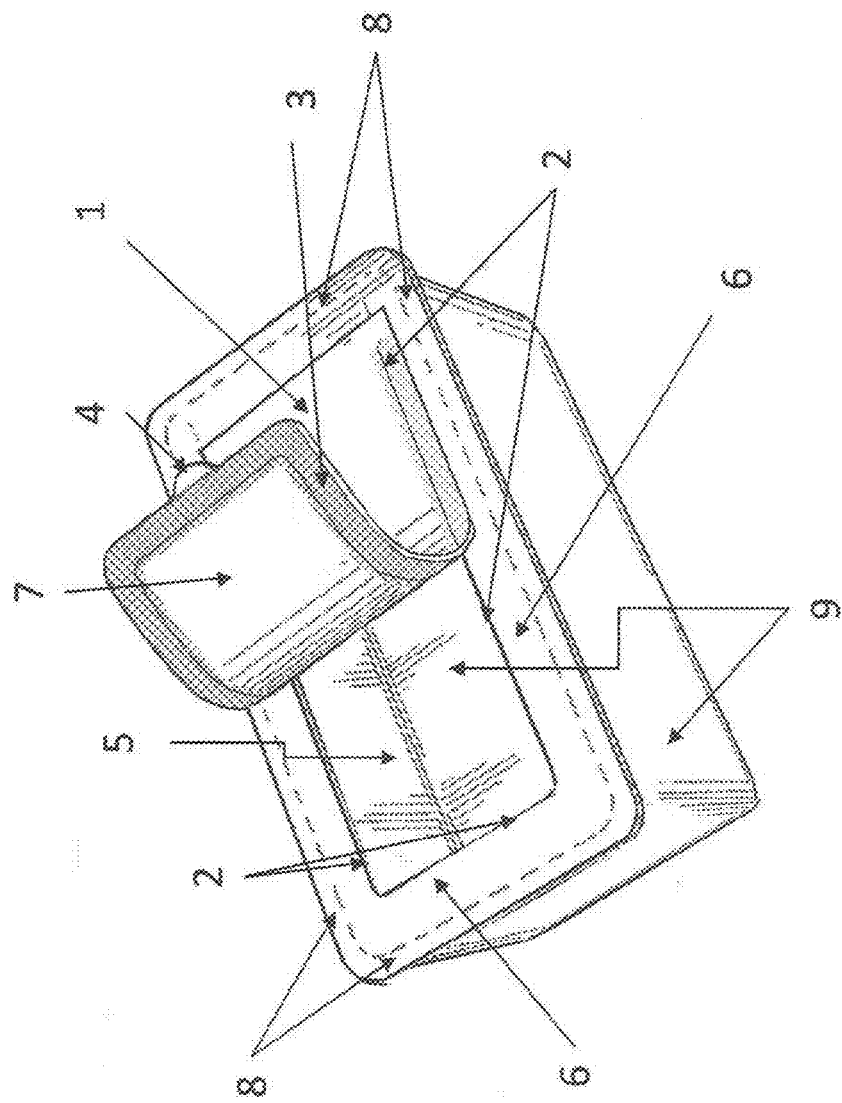
FIG. 15 is a top side perspective view of the second embodiment of the scored and labeled resealable packaging according to the present invention with an alternative numbering scheme, the label construction of the second embodiment being shown in a partially peeled back configuration.
Figure 16:
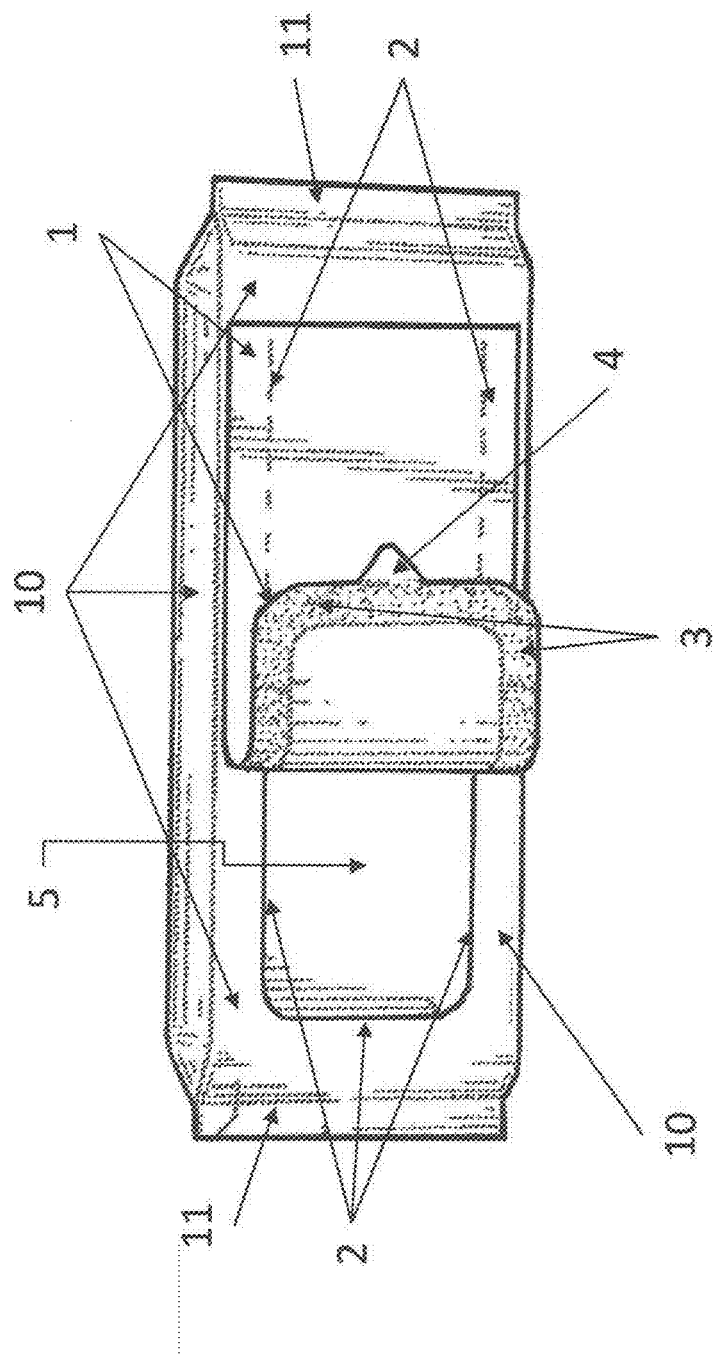
FIG. 16 is a top side perspective view of the first embodiment of the scored and labeled resealable packaging according to the present invention with an alternative numbering scheme, the label construction of the first embodiment being shown in a partially peeled back configuration.
Figure 17:
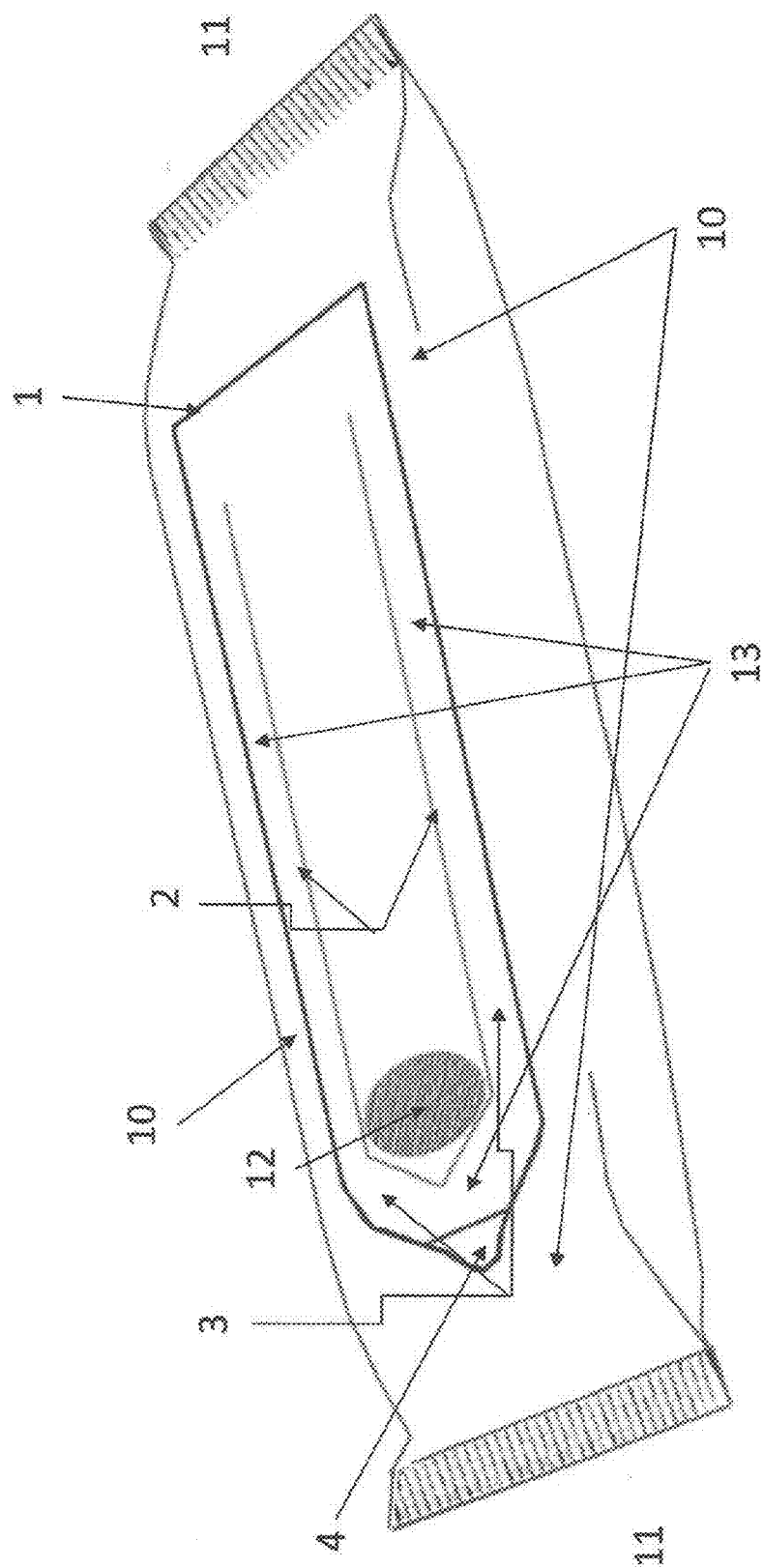
FIG. 17 is a top side perspective view of the third embodiment of the scored and labeled resealable packaging according to the present invention with an alternative numbering scheme, the label construction of the third embodiment being shown in a package-closing configuration.
Figure 18:
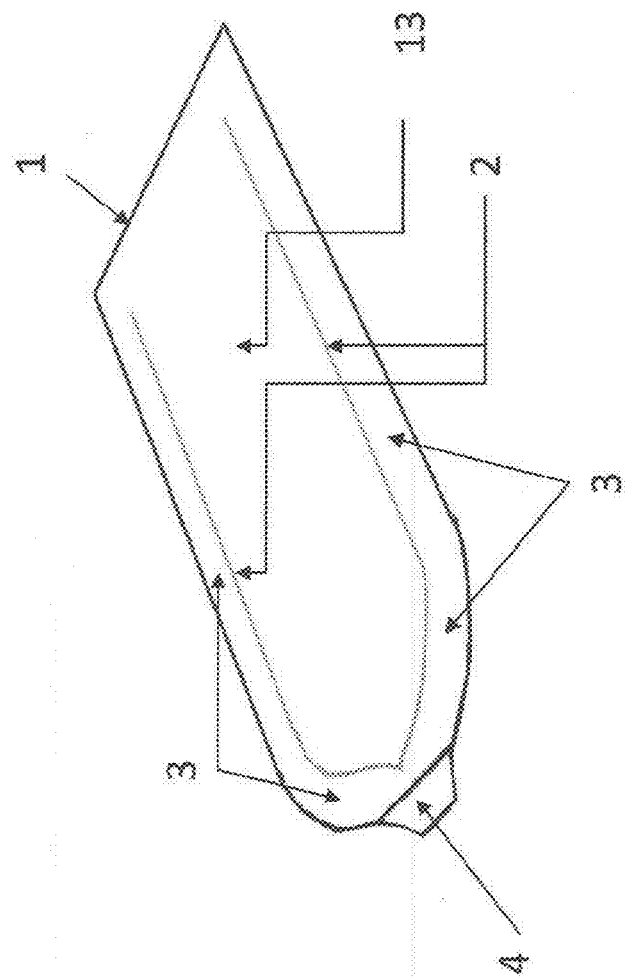
FIG. 18 is a bottom perspective view of the label construction of the third embodiment of the scored and labeled resealable packaging according to the present invention with alternative numbering scheme, the label construction being shown with all adhesive zones removed.
Figure 19:
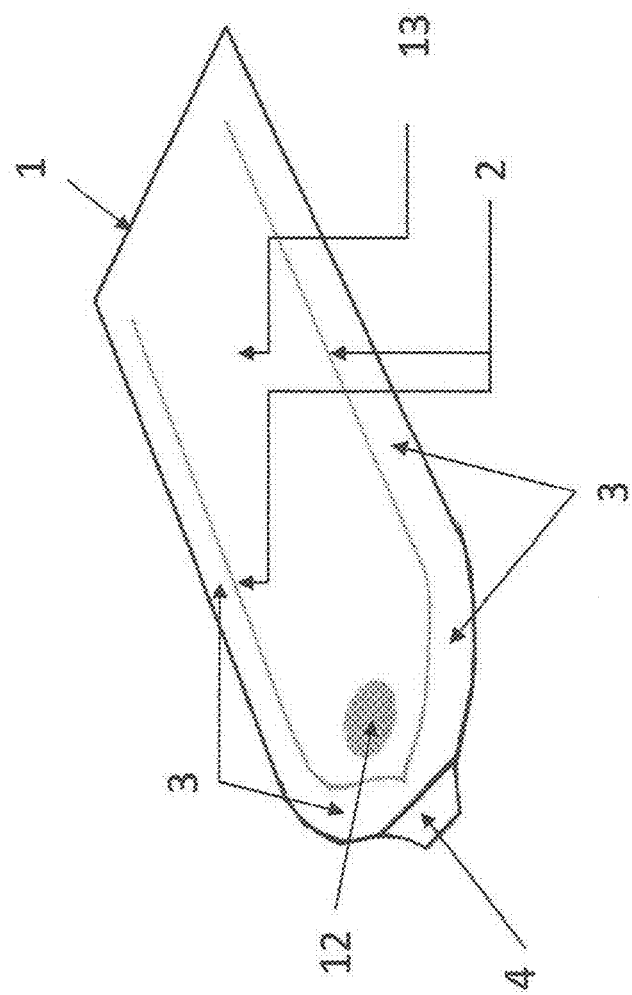
FIG. 19 is a bottom perspective view of the label construction of the third embodiment of the scored and labeled resealable packaging according to the present invention as otherwise depicted in FIGS. 9 and 18 with an alternative numbering scheme, but for the label construction being shown with a permanent adhesion zone included.
Figure 20:
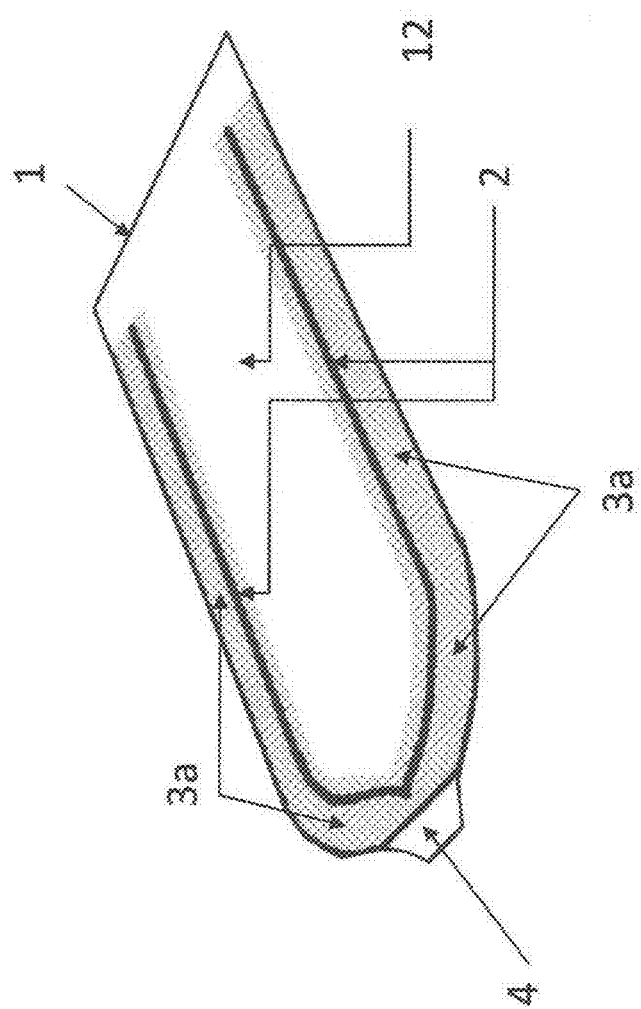
FIG. 20 is a bottom perspective view of the label construction of the third embodiment of the scored and labeled resealable packaging according to the present invention as otherwise depicted in FIGS. 9 and 18 with an alternative numbering scheme, but for the label construction being shown with a releasable adhesion zone included.
Figure 21:
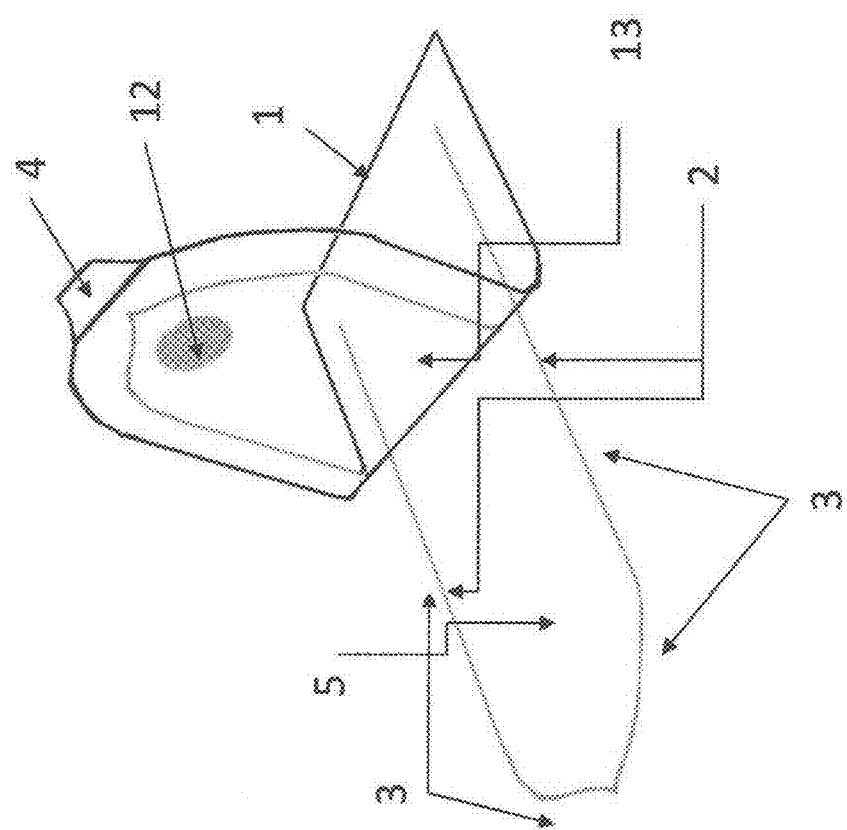
FIG. 21 is a fragmentary top side perspective view of the third embodiment of the scored and labeled resealable packaging according to the present invention with an alternative numbering scheme, the label construction of the third embodiment being shown in a peeled back configuration atop a fragmentary lower container or wrapper construction.
Figure 22:
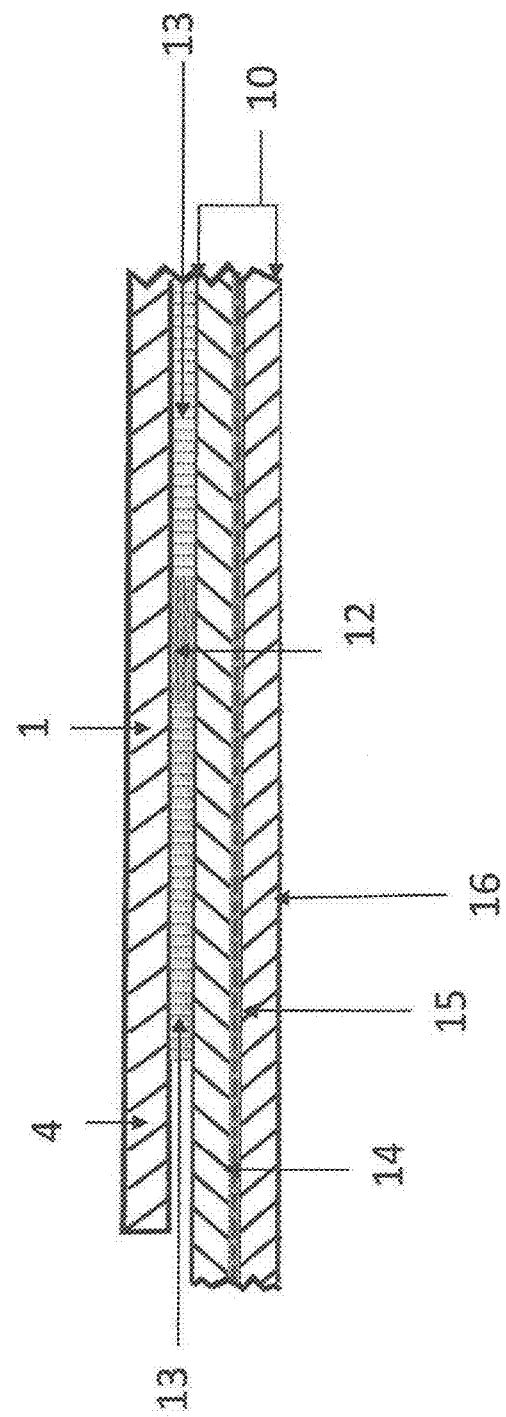
FIG. 22 is an enlarged, fragmentary cross-sectional view of the first embodiment of the scored and labeled resealable packaging according to the present invention with an alternative numbering scheme taken along a center longitudinal center plane of the first embodiment.
Figure 23:
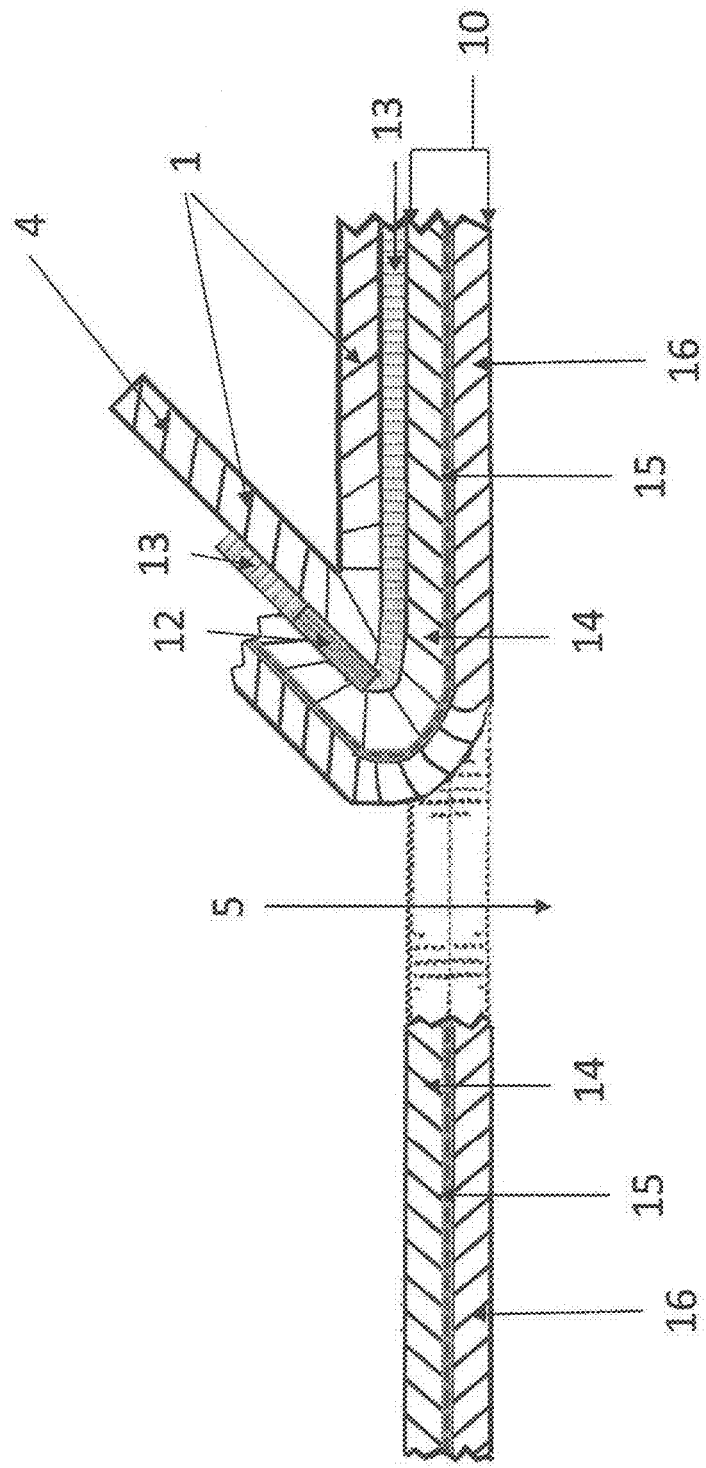
FIG. 23 is an enlarged, fragmentary cross-sectional view of the first embodiment of the scored and labeled resealable packaging according to the present invention with an alternative numbering scheme taken along a center longitudinal center plane of the first embodiment and depicting an initial opening of the packaging.
Figure 24:
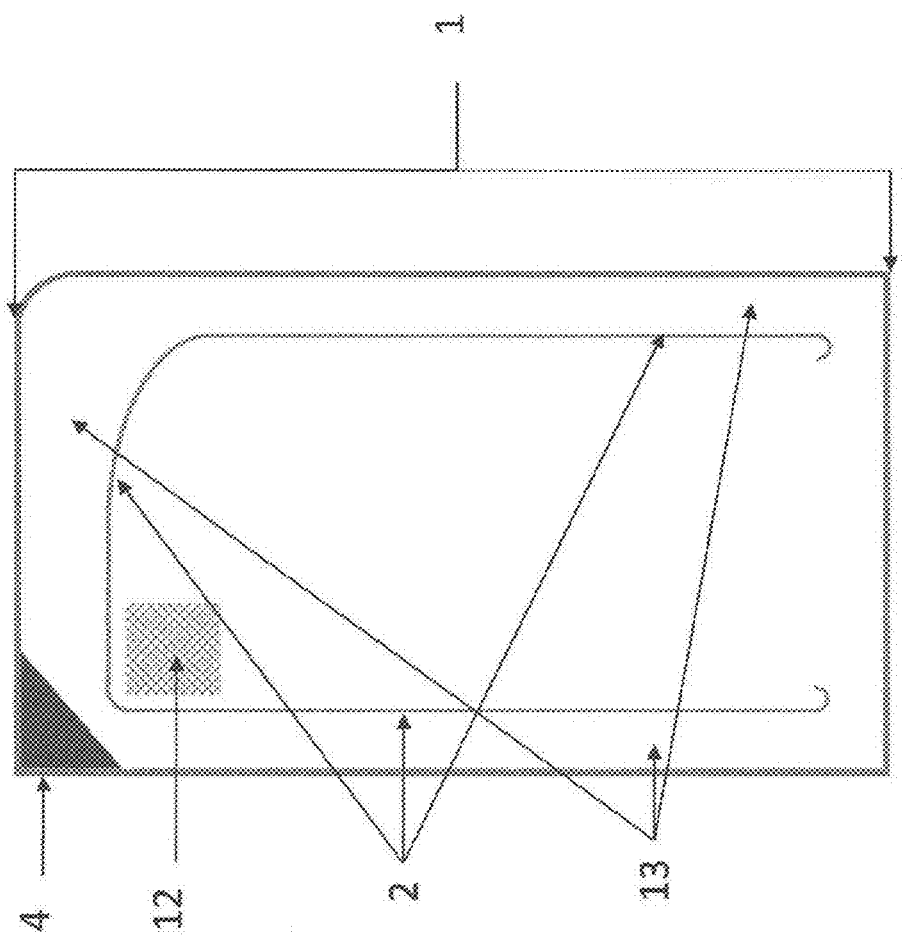
FIG. 24 is a bottom plan view of the fourth label construction of the scored and labeled resealable packaging according to the present invention with an alternative numbering scheme, the label construction being shown with both a permanent adhesion zone and a zero-to-negligible adhesion zone included, the removable adhesion zone not being depicted.
Figure 25:
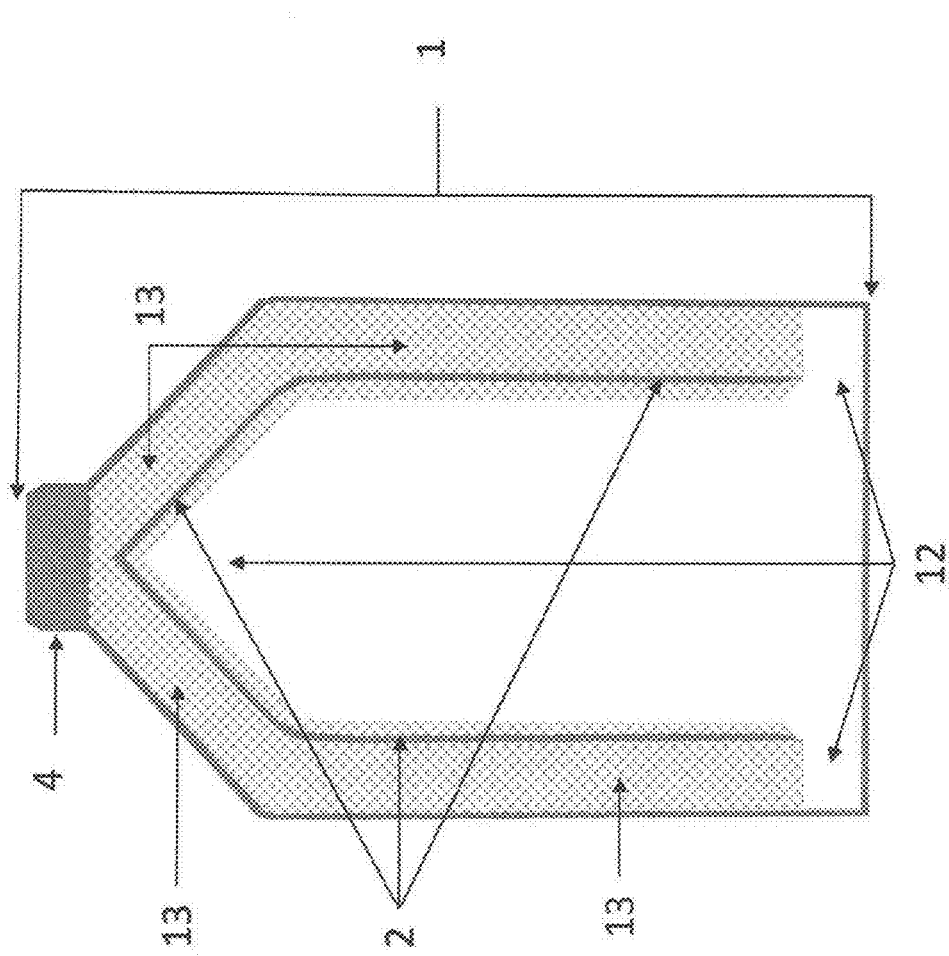
FIG. 25 is a bottom plan view of the label construction of the third embodiment of the scored and labeled resealable packaging according to the present invention with an alternative numbering scheme and as otherwise depicted in FIG. 9, but for the label construction being shown with a releasable adhesion zone included.
Figure 26:
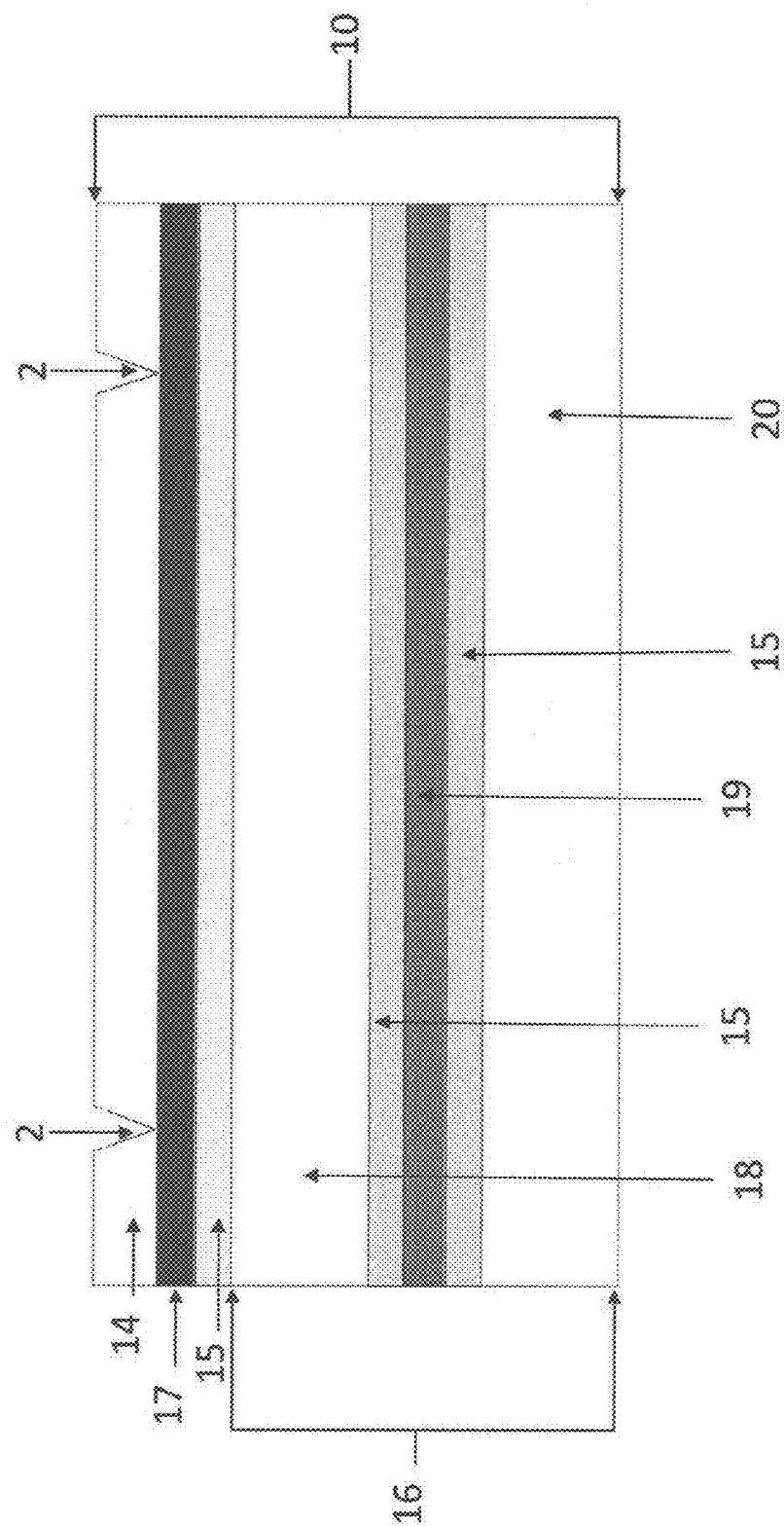
FIG. 26 is an enlarged fragmentary diagrammatic depiction of a layered construction of a flexible packaging lamination according to the present invention.

A fourth label construction 311 according to the present invention is generally depicted and referenced in FIG. 14. The label construction 311 is designed for attachment to a package such that during the manufacturing of package, an inner film layer is not cut along score line 320 and an outer film layer is scored along the score line 320. The score line 320 is formed as a continuous tear line to define an inner panel portion 322. The inner panel portion 322 is separated from the remainder of the inner film layer and the outer film layer to expose an opening in the package, whereby access to the contents of the package may be gained.

The area of the outer film layer directly underneath the label construction 311 is the outer perimeter of the resealing area 321 defines resealing outer panel portion 326, which is the inside surface of the label 311, coated with a peelable and resealable tack adhesive. The resealing outer panel portion 326 extends outwardly beyond the periphery of the score line 320, adjacent to the opening of the outfitted package so that the resealing outer panel portion 326 completely covers and extends beyond the perimeters of the inner panel portion 322.

The side of the resealing outer panel portion 326 which faces the outer film layer is coated with a releasable and resealable adhesive on the inner surface of the label 311 so that the sealing outer panel portion 326 may be releasably secured to the outer film layer at a position adjacent to the inner panel portion 322. The releasable adhesive can be any pressure sensitive adhesive which allows resealing. The resealing outer panel portion 326 is provided with a starter portion or tab 330 or other gripping feature which is not coated with the adhesive or the adhesive had been completely deadened so that the sealing outer panel portion 326 may be peeled back from the outer film layer to open the label-outfitted package.

A coating of non-transferable or permanent adhesive 327A is preferably located on all or a portion of the label construction 311 inside the perimeter of the score line 320. If only a portion of the label inside the perimeter of the score line 320 is to be coated with the permanent adhesive 327A, the permanent adhesive 327A must be in the proximity of the opening tab 330, within the perimeter of the score line 320 so that the resealing outer panel portion 326 will function properly to reseal the package after the initial and subsequent opening of the package.

The proper function of the present invention relies on a differential in adhesion levels of the coatings on the inside of the label 311. One alternative is to apply a releasable and resealable adhesive over the entire inside surface of the label 311, and on the inside of the tab 330 another coating is applied that completely deadens the adhesion. This complete deadening can also be accomplished by having a void in the adhesive coverage on the inside of the tab area 330.

Inside the perimeter of the score line 320 the label construction 311 must be coated with a non-releasable or permanent adhesive 327A. The releasable and resealable adhesive maintains its bond level in the resealing outer panel portion 326. The permanent adhesive 327A grips tightly to the outer film layer such that the force required to remove the label 311 from the outer film layer is significantly higher than the force required to break the inner film layer as the user peels back the label construction 311 to initially open the package.

In an alternative embodiment, the differing bonding strengths of the adhesives applied to the label construction 311 can be accomplished by applying a non-releasable or permanent adhesive 327A over the entire inside surface of the label construction 311, and then applying another coating over the permanent adhesive 327A on the inside of the tab 330 to reduce the bond strength to zero, or very close to zero, and apply a coating over the permanent adhesive 327A that deadens the bond strength to approximately half of its original bond strength in the resealing outer panel portion 326, such that the adhesive in the resealing outer panel portion 326 is releasable and resealable.

The inner panel portion 322 is separated from the remainder of the inner film layer along the first tear line 320 and remains adhered to the sealing outer panel portion 326 as the sealing outer panel portion 326 is peeled back to open the package. After the contents of the package have been accessed and it is desired to reseal the package, the sealing outer panel portion 326 may be reapplied to the inner film layer, approximately in its original position. Because the sealing outer panel portion 326 extends beyond the periphery of the inner panel portion 322, the releasable adhesive disposed thereon facilitates the resealing of the package with the inner panel portion 322 positioned over the access opening.

Referencing FIG. 14, the reader will further note that the score line 320 preferably comprises inwardly curved termini as a 340. The inwardly curved termini as at 340 preferably curve inwardly toward the centerline 341 of the label construction 311 rather than outwardly away from the centerline 341 to prevent tears of the label-outfitted package.

Referencing FIGS. 15-26, the reader will note a re-presentation of various constructions with alternative reference numerals being used to identify the various structures as follows. The following number scheme is to be used in connection with FIGS. 15-26 only.

ALTERNATIVE REFERENCE NUMERALS AND STRUCTURAL LISTING FOR SUPPLEMENTAL FIGS. 15-26

1. Label
2. Laser Score
3. Reseal Area
4. Opening Tab
5. Opening
6. Top Film—Outside the Score
7. Top Film—Inside the Score
8. Seal Area—Top Film to Flange of the Bottom Film
9. Bottom Film
10. Flexible Packaging Lamination
11. End Seal
12. Permanent Adhesive
13. Peelable & Resealable Adhesive
14. Outer Ply of Flexible Packaging Lamination
15. Adhesive or Bonding Resin
16. Sealant Layer of Flexible Packaging Lamination
17. Ink
18. Polyolefin Resin Layer of Coextrusion
19. Bather Resin of Coextrusion or Foil
20. Sealing Resin of Coextrusion While the above descriptions contain much specificity, this specificity should not be construed as limitations on the scope of the invention, but rather as an exemplification of the invention. For example, whenever possible, the same or similar reference numerals are used in the drawings and the specifications to refer to the same or like parts or steps. The drawings are in simplified form and are not to precise scale.

For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The pressure-sensitive label construction according to the present invention does not have only peelable adhesive in contact with the first layer of film, otherwise the label could be peeled off of the first layer without activating the score and breaking into the second layer of film, therefore inside the perimeter of the score-line in the first layer of film a permanent adhesive must be applied which grips the first layer such that a peeling action of the label will apply pressure of the score at the point of opening and force the second layer of film to break at the point of opening and propagate a tear along the score-line thus creating the opening flap.

The bond between the first and second layer must be high so the first layer will not delaminate from the second layer of film when the label is peeled. The second layer of film must be designed to break from the force of peeling by hand without being scored and it must also be designed to tear neatly along the score-line as the flap is opened. The force of opening the flap the first time is higher than it will be after the package has been opened the first time.

The individual opening the package for the first time will receive visual and tactile cues indicating that the package has not been opened previously, and these cues provide tamper evidence. A fundamental facet of the present invention is that the lamination of the first and second layers of film have not been cut completely through prior to the first opening. This provides that the package can retain all of its barrier properties prior to opening.

The score may penetrate entirely through the first layer of film, but even if the depth of the score in the first layer penetrates only to a majority of the thickness of the layer, the opening feature should function. The first layer is typically an oriented film whereas the second layer is not oriented. The use of an oriented first film and a non-oriented second film describes a typical structure for this package concept. There are two other possibilities; an oriented first film laminated to an oriented second film, and an oriented coextruded film with separate layers composed of different plastic resins, which display properties similar to laminations of oriented and non-oriented films. In the first exception, when the first and second layers of film are oriented, it may be necessary to score both this first and second layer along the perimeter of the flap. If two oriented films are used, it is necessary that at least one of the films has not been scored to a depth equal to the total thickness of the film. In the second exception, when a single oriented coextruded film is used, the layers that display characteristics typical of oriented films should be scored and the less crystalline, sealing layers must remain unscored.

Although the invention has been described above in relation to preferred embodiments thereof, it will be understood by those skilled in the art that variations and modifications can be effected in these preferred embodiments without departing from the scope and spirit of the invention.

I claim:

1. A package having a package integrity enclosure comprising:
a pressure-sensitive label adhered to a laminated top having a first film layer and a second film layer, an access opening being formed in the laminated top, the access opening being formed in the first film layer by a peripheral score-line along an opening flap and a sealing panel formed by a margin in which the perimeter of the pressure-sensitive label exceeds the perimeter of the score-line in the first film layer, the second film layer, not being scored, must be broken and torn along the score-line of the first film layer thereby forming a first tear line to open the package and achieve access thereto, the margin of the sealing panel extending beyond the first tear line forming the access opening, a peelable and resealable adhesive being disposed on the pressure-sensitive label and extending outside the perimeter of the score-line of the first film layer thereby creating an outer boundary of the opening flap, the margin between the outer perimeter of the pressure-sensitive label and an outer perimeter of the score-line forms the sealing panel on the first film layer facing the pressure-sensitive label; inside the score-line the pressure-sensitive label having a non-peelable, permanent bond adhesive covering all or at least a portion of the pressure-sensitive label inside the perimeter of the score-line, adjacent to an opening point where the second film layer must be torn to initiate opening of the opening flap; and
wherein the resealable adhesive is disposed on a pressure-sensitive label upon the margin of the sealing panel, from the outer perimeter of the pressure-sensitive label to slightly inside the area over the score in the top layer of the packaging material and a permanent adhesive is disposed on the pressure-sensitive that is positioned inside the score on the top layer of the packaging lamination which becomes the access panel or opening flap of the package.

2. The package of claim 1 wherein a bond strength between a coating on the pressure-sensitive label and a top layer of a packaging material lamination is higher than the force required to break and tear inner layers of the packaging material lamination.

3. The package of claim 1 wherein the peelable and resealable and permanent adhesives on the pressure-sensitive label are selected from the group consisting of low tack and high tack adhesives.

4. The package of claim 1 wherein the peelable and resealable adhesive is disposed upon the pressure-sensitive label facing the margin of the sealing panel on a top layer of the laminated top.

5. The package of claim 1 further comprising a second adhesive disposed on the pressure-sensitive label facing the opening flap of the package which is the area inside the score-line on the top layer.

6. The package of claim 5 wherein the peelable and resealable adhesive is configured to reseal the package after initial opening and wherein the second adhesive continues to adhere to the opening flap of the package as the package is repeatedly opened and closed.

7. The package of claim 1 wherein the peelable and resealable adhesive on the pressure-sensitive label facing the resealing panel on the top of the package a significant reduction in required peel force between the resealing panel and the pressure-sensitive label due to the fact that the second layer have been previously broken and torn along the score-line on the first layer upon the initial opening of the package, providing an indication of previous opening.

* * * * *